US 6,627,314 B2

(12) United States Patent
Matyjaszewski et al.

(10) Patent No.: US 6,627,314 B2
(45) Date of Patent: Sep. 30, 2003

(54) PREPARATION OF NANOCOMPOSITE STRUCTURES BY CONTROLLED POLYMERIZATION

(75) Inventors: Krzysztof Matyjaszewski, Pittsburgh, PA (US); Jeffrey Pyun, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 09/972,046

(22) Filed: Oct. 5, 2001

(65) Prior Publication Data
US 2002/0106513 A1 Aug. 8, 2002

Related U.S. Application Data
(60) Provisional application No. 60/238,811, filed on Oct. 6, 2000.

(51) Int. Cl.$^7$ .................................................. B32B 5/16
(52) U.S. Cl. ..................... 428/403; 428/405; 428/407; 526/111; 526/135; 526/145; 526/146; 526/147; 528/10; 528/41
(58) Field of Search ................................ 428/403, 405, 428/407; 526/111, 155, 145, 146, 147; 528/10, 41

(56) References Cited

U.S. PATENT DOCUMENTS

| | | | |
|---|---|---|---|
| 5,026,813 A | * 6/1991 | Meder ........................ | 528/18 |
| 5,102,967 A | * 4/1992 | Meder ........................ | 528/10 |
| 5,763,548 A | 6/1998 | Matyjaszewski et al. ... | 526/135 |
| 5,789,487 A | 8/1998 | Matyjaszewski et al. ... | 525/301 |
| 5,807,937 A | 9/1998 | Matyjaszewski et al. ... | 526/135 |
| 5,910,549 A | 6/1999 | Matyjaszewski et al. ... | 526/217 |
| 5,945,491 A | 8/1999 | Matyjaszewski et al. ... | 526/111 |
| 6,057,042 A | * 5/2000 | Shimotsu ................... | 428/451 |
| 6,111,022 A | 8/2000 | Matyjaszewski et al. ... | 525/238 |
| 6,121,371 A | 9/2000 | Matyjaszewski et al. ... | 524/804 |
| 6,124,411 A | 9/2000 | Matyjaszewski et al. ... | 526/111 |
| 6,162,882 A | 12/2000 | Matyjaszewski et al. ... | 526/111 |
| 6,288,186 B1 | 9/2001 | Matyjaszewski et al. ... | 526/220 |
| 6,407,187 B1 | 6/2002 | Matyjaszewski et al. ..... | 526/89 |
| 6,512,060 B1 | 1/2003 | Matyjaszewski et al. ... | 526/111 |

OTHER PUBLICATIONS

Von Werne, Timothy and Patten, Timothy E.—Preparation of Structurally Well–Defined Polymer—Nanoparticle Hybrids with Controlled/living Radical Polymerizations—J. Am. Chem. Soc. 1999, 121, 7409–7410.

Shen, Youquing; Zhu, Shiping; Zeng, Faquan and Pelton, Robert—Suported Atom Transfer Radical Polymerization of Methyl Methacrylate Mediated by CuBr–Tetraethyldiethylenetriamine Grafted onto Silica Gel—Journal of Polymer Science: Part A: Polymer Chemistry, vol. 39, 1051–1059 (2001); John Wiley & Sons, Inc.

Caruso, Frank—Nanoengineering of Particle Surfaces—Adv. Mater. 2001, 13, No. 1, Jan. 5, 11–22—Wiley–VCH Verlag GmbH.D–69469 Weinheim, 2001.

* cited by examiner

Primary Examiner—Leszek Kiliman
(74) Attorney, Agent, or Firm—Kirkpatrick & Lockhart LLP

(57) ABSTRACT

The present invention describes preparation of nanocomposite particles and structures by polymerizing monomers onto a functional inorganic colloid comprising a polymerization initiation site. The polymerization process is preferably a controlled/living polymerization process, including but not limited to, atom transfer radical polymerization and stable free radical polymerization. The nanocomposite particles can self-organize in solution, on surfaces or in films forming nanocomposite structures. Tethered AB block nanocomposite particles bring size control, solubility control and control over micro- and macro-functionality to the particles. The process may be catalyzed by a transition metal complex which participates in a reversible redox cycle with at least one of the group and a compound having a radically transferable atom or group, to form a nanocomposite particle with a tethered polymer chain. The process may be continued to form tethered copolymer chain. The particle may be silicon based including, for example, silica, silicates and polysilsesquioxane. A nanocomposite structure may be formed by casting, depositing or forming the material including nanocomposite particles.

64 Claims, 19 Drawing Sheets

PREPARATION OF NANOCOMPOSITE STRUCTURES BY CONTROLLED POLYMERIZATION

CROSS REFERENCE TO RELATED APPLICATIONS

This application is a nonprovisional application claiming priority from U.S. Application Serial No. 60/238,811 filed Oct. 6, 2000.

FIELD OF INVENTION

The invention is directed towards the preparation of nanocomposite particles and structures. A nanocomposite particle and structure may comprise a core and a grafted or tethered polymer. The nanocomposites may be formed by polymerizing monomers onto a functional inorganic colloid comprising a polymerization initiation site. The polymerization process is preferably a controlled/living polymerization process, including but not limited to, atom transfer radical polymerization and stable free radical polymerization. The nanocomposite particles can self-organize in solution, on surfaces or in films forming nanocomposite structures. Tethered AB block nanocomposite particles bring size control, solubility control and control over micro- and macro-functionality to the particles.

BACKGROUND OF THE INVENTION

There is a continuing effort in polymer chemistry to develop new polymer processes and new polymers. A relatively recent development in polymer chemistry has been the development of controlled or living polymerization processes. A controlled or living polymerization process is one in which chain transfer and termination reaction are essentially nonexistent relative to the polymer propagation reaction. These developments have led to the production of polymers that exhibit macro functionality and to the development of functional polymers that possess specific chemical reactivity. The new polymers extend the level of control available to materials engineers in processing polymers and using polymers as building blocks in, or components for, subsequent material forming reactions, such as copolymerizations, chain extensions and crosslinking reactions, and interaction with substrates, including dispersed solids.

A significant economic hurdle which continually needs to be overcome in this effort is to provide the benefits of controlled polymerization from available low cost monomers in available commercial process equipment. These long term objectives have provided the backdrop, or driving force, for the continuing advances in controlled polymerization of radically (co)polymerizable monomers, disclosed in earlier patent applications, and provide the incentive to extend, simplify and make more robust the process known as atom transfer radical polymerization (ATRP).

The recently developed and polymers developed from the classic ATRP reaction are described in U.S. patent applications Ser. Nos. 09/018,554 now U.S. Pat. No. 6,538,051 and 09/534,827 now abandoned, the entire contents of which are hereby incorporated herein by reference. Methods for exercising control over many parameters in a catalytic process for the controlled polymerization of a wide range of free radically (co)polymerizable monomers have been described in publications authored or co-authored by Krzysztof Matyjaszewski and others. See for example, Wang, J. S. and Matyjaszewsk, K., *J. Am. Chem. Soc.*, vol. 117, p.5614 (1995); Wang, J. S. and Matyjaszewsk, K., *Macromolecules*, vol. 28, p. 7901 (1995); K. Matyjaszewski et al., *Science*, vol. 272, p.866 (1996); K. Matyjaszewski et al., "Zerovalent Metals in Controlled/"living" Radical Polymerization," *Macromolecules*, vol. 30, pp. 7348–7350 (1997); J. Xia and K. Matyjaszewski, "Controlled/"Living" Radical Polymerization. Homogenous Reverse Atom Transfer Radical Polymerization Using AIBN as the Initiator," *Macromolecules*, vol. 30, pp. 7692–7696 (1997); U.S. patent application Ser. No. 09/126,768, now U.S. Pat. No. 6,121,371 the entire contents of which are hereby incorporated by reference; U.S. Pat. Nos. 5,807,937, 5,789,487, 5,910,549, 5,763,548, and 5,789,489, the entire contents of each are hereby incorporated herein by reference. The subtle interactions between the parameters have been further explored and implementation of the teachings disclosed in these publications has allowed the preparation of many inherently useful novel materials displaying control over functionality and topology, and production of novel tele-functional building blocks for further material forming reactions, resulting from application of the site specific functional and topological control attainable through this robust controlled polymerization process for free radically (co)polymerizable monomers.

The system or process employed to gain control over the polymerization of free radically (co)polymerizable monomers has been described in earlier applications as comprising the use of four components: (i) an initiator molecule; (ii) a transition metal compound having (iii) an added or associated counterion and the transition metal compound complexed with (iv) a ligand(s). The initiator molecule, or polymerization originator molecule may be any molecule comprising one or more radically transferable atom(s) or group(s) capable of participating in a reversible redox reaction with the transition metal compound. The transition metal compound may include an added or associated counterion and comprise a transition metal salt. So that all reactive oxidation states are soluble to some extent in the reaction medium, the transition metal may be complexed with the ligand(s). The components of the system may be optimized to provide more precise control for the (co)polymerization of the free radically polymerizable monomers. See U.S. Pat. No. 5,763,548, the entire contents of which are hereby incorporated herein by reference.

In an embodiment known as "reverse" ATRP, the initiator molecule described above can be formed in-situ by reaction of a free radical with the redox conjugate of the transition metal compound. Other components of the polymerization system such as the choice of the radically transferable atom or group, counterion initially present on the transition metal, and optional solvent may influence the process. U.S. Pat. No. 5,807,937 provides as an example of a single molecule containing a combination of functions, a complex in which the counterion and ligand components are in one molecule. The role of a deactivator, the "persistent radical," or for ATRP, the transition metal redox conjugate, is also described in U.S. Pat. No. 5,807,937.

While not to be limited to the following description, the theory behind ATRP disclosed in the previous work is that polymerization proceeds essentially by cleavage (and preferably essentially homolytic cleavage) of the radically transferable atom or group from the initiator molecule or, during the polymerization process the dormant polymer chain end, by a reversible redox reaction with a complexed transition metal catalyst, without any strong carbon-transition (C—$M_t$) bond formation between the active growing polymer chain end and the transition metal complex. Within this theory as the transition metal complex, in a lower active oxidation state, or in its activator state, activates the initiator or dormant polymer chain end by homolytically removing the radically transferable atom or group from the initiating molecule, or growing polymer chain end, in a reversible redox reaction, an active species is formed that allows other chemistry, essentially free radical based chemistry to be conducted. The transition metal complex in the higher oxidation state, the redox conjugate state or deactivator state, transfers a radically transferable atom or group to the active initiator molecule or growing chain end, thereby reforming the lower oxidation state transition metal complex. When free radical based chemistry occurs, a new molecule comprising a radically transferable atom or group is also formed. In prior publications, the catalytically active transition metal compound, which can be formed in situ or added as a preformed complex, has been described as containing a range of counterions. The counterion(s) may be the same as the radically transferable atom or group present on the initiator, for example a halide such as chlorine or bromine, or may be different radically transferable atoms or groups. An example of the latter counterion is a chloride counterion on the transition metal compound when the initiator first contains a bromine. Such a combination allows for efficient initiation of the polymerization followed by a controlled rate of polymerization, and has additionally been shown to be useful in certain crossover reactions, from one set of (co)monomers to a second set of (co)monomers, allowing efficient formation of block copolymers.

As used herein, the terms "polymer" and "(co)polymers" includes homopolymer and copolymer (unless the specific context indicates otherwise), which may include, but is not limited to, block, random, statistical, periodic, gradient, star, graft, comb, (hyper)branched or dendritic. The term "(co) polymerizable monomer" means a monomer that may be directly polymerized by the polymerization mechanism being discussed and additionally a comonomer may be copolymerized with the monomer into a copolymer. Similarly "(hyper)" is meant to incorporate the concept that the degree of branching along the polymer backbone can be a low degree of branching up to a very high degree of branching or wherein the branches themselves may have further branches.

The creation of particles comprising polymeric shells has been attracting a significant amount of attention recently. These nanocomposite particles and the structures produced from nanocomposite particles have applications in the fields of nanotechnology, lubrication, catalysis and in drug delivery. The creation of these particles has centered around composite colloidal systems that comprise solid cores coated with polymers, inorganics or biomacromolecules. The processes developed to produce polymer coated particles may be generally classified in two main classes: polymerization at the particle surface or adsorption onto the particles.

Polymer coated particles have been prepared by absorption of monomers onto the particle surface and subsequently polymerizing the monomer forming a shell on the particle. In this process, the polymerization reaction may be catalyzed by a separate initiator to promote the polymerization or catalyzed by the colloidal particle. It has been shown that the thickness or the polymer coating may be controlled by varying the contact time of the cores with the polymerization solution. The ultimate polymer layer thickness is dependent on the type of core used and the presence of additional polymeric material. In some cases, however, it may be difficult to produce a polymeric shell of a desired thickness. The fact that the core affects the thickness and composition of the shell may limit the formation of polymer layers of a well defined thickness on colloidal cores of choice.

Polymer coated colloidal particles have also been produced by trapping and aligning uncoated particles in the pores of membranes by vacuum filtration, followed by the polymerization of a conducting polymer inside the pores. This approach has been performed with gold nanoparticles being filtered into a porous $Al_2O_3$ support membrane with a pore size of 200 nm. An initiator was then poured into the top of the membrane and several drops of monomer were placed beneath the membrane. The monomer vapor diffused into the membrane and contacted the initiator to form polymer. Deposition of the polymer was preferentially on the surface of the gold nanoparticles. This resulted in the formation of hybrid polymer encapsulated gold nanoparticles that were isolated by dissolution of the membrane material. The ability to controlling the thickness and the composition of the polymer coating is an attractive feature of this process. The thickness is dependent on the polymerization time and has been varied from 5 to 100 nm. Long polymerization times have produced aggregated particles or pseudo-one-dimensional strings or nanoparticles. Fine control of the thickness of the shell may be difficult depending on how the particles pack into the membrane. In addition, the particle type appears to be limited to those that fir in the membrane supports used.

Additional processes for the polymer coating particle include heterocoagulation of small coating particles with larger core ones followed by heating. Heating above the glass-transition temperature of the small particles causes them to spread while the polymer migrated to the outer surface. Difficulties exist in this process in obtaining the desired coating of the smaller particles to form a continuous film on the larger colloids. Colloidal stability may also be compromised when irregular coatings are produced by this method.

Emulsion polymerization methods have also been used to produce core-shell particles. This approach has been used to encapsulate submicrometer- and micrometer-sized organic and inorganic particles with polymer layers. A major limitation of this method has been that it often leads to aggregated particles embedded in a polymer matrix. This coating process appears to be best applicable to the formation of thin coatings as they follow the shape of the metal core, while thicker ones (>10 nm) take on a globular geometry and form irregular coatings.

There exists a need for composite nanoparticles with uniform polymer shells. More specifically, there exists a need for a polymerization process which produces composite nanoparticles comprising a particle core and a tethered polymers, preferably with a narrow polydispersity.

There also exists a need for a process which produces a variety of functionalized particles capable of being used as initiators in polymerization processes.

SUMMARY OF THE INVENTION

The present invention meets the needs by providing a polymerization process including the polymerization of radically polymerizable (co)monomers in the presence of an initiation system comprising a functional particle initiator. The functional particle includes a nanoparticle and a group comprising a radically transferable atom or group. The process may be catalyzed by a transition metal complex which participates in a reversible redox cycle with at least one of the group and a compound having a radically transferable atom or group, to form a nanocomposite particle with a tethered polymer chain. The present invention may include further polymerization of additional radically polymerizable comonomers on the tethered polymer chain to form an tethered copolymer chain. The particle may be silicon based including, for example, silica, silicates and polysilsesquioxane.

The present invention a process for the preparation of a functional particle. A polysilsesquioxane particle with reactive groups on the surface is reacted with a silane comprising two functional groups, an alkoxy group and group comprising a polymerization initiation site. A solvent switch technique for the preparation of a functional particle is also provided. The solvent switch technique comprises preparing a silica particle in a first solvent and adding a second solvent to the first solvent. The first solvent is then removed from the silica particle and the particle is functionalized by reacting a silane comprising a initiating functional group to the silica particle.

A polymerization process comprising polymerizing free radically polymerizable (co)monomers in the presence of an initiation system comprising a functional particle initiator comprising polysilsesquioxane and a radically transferable atom or group is also provided. The polymerization process is catalyzed by a transition metal complex which participates in a reversible redox cycle with at least one of the group and a compound having a radically transferable atom or group, to form the nanocomposite particle with a tethered polymer chain.

The present invention also includes a process for the preparation of a nanocomposite structure. A nanocomposite structure may be formed by casting, depositing or forming the material including nanocomposite particles into the nanocomposite structure.

DESCRIPTION OF THE DRAWINGS

FIG. 10b is a graph of SEC data of a composite nanoparticle produced by the scheme of FIG. 10a;

DETAILED DESCRIPTION OF THE INVENTION

Figure 1A:
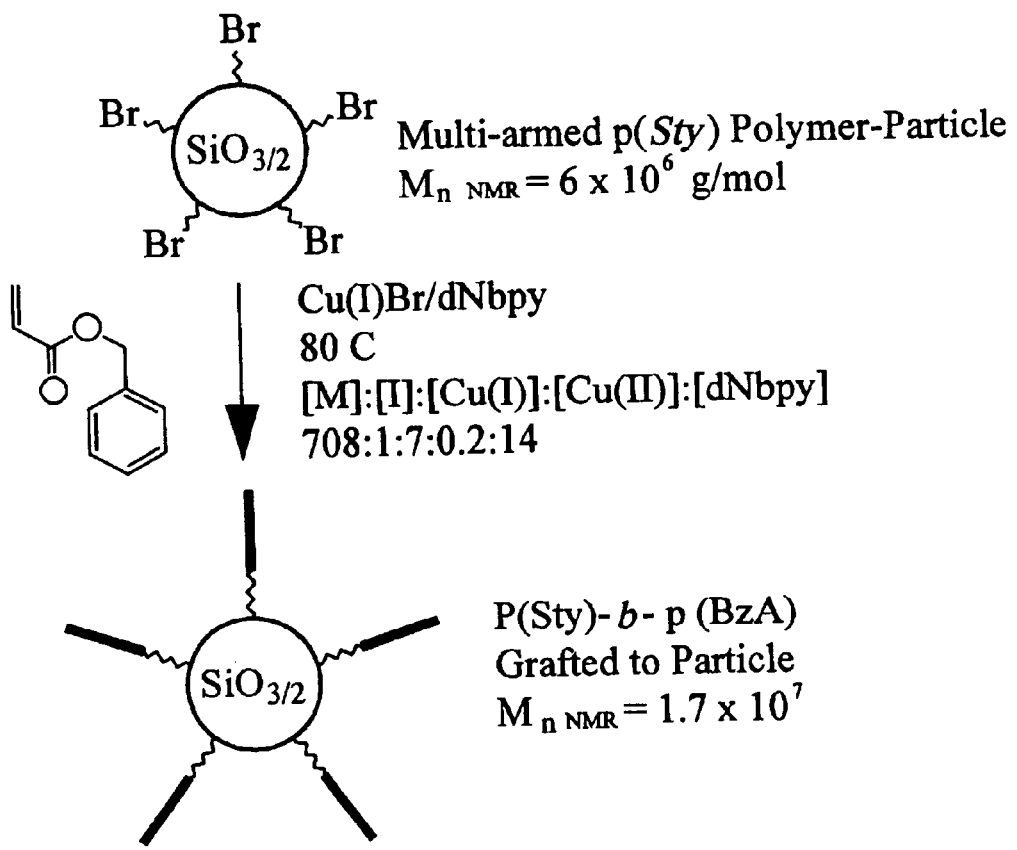
FIG. 1a is a diagram of the polymerization process of the present invention to produce block copolymers tethered to nanoparticles.

The present invention relates to the synthesis of nanocomposite particles and nanocomposite structures. More particularly, the present invention relates to the preparation of nanocomposite particles and nanocomposite structures with an inorganic core and organic based polymer shell(s). The composite nanoparticles may self-organize into a nanocomposite structure. As used herein, "self-organize" means that the nanocomposite particles form nanocomposite structures based upon structure of the particle and the environment in which the particles are present. The structures comprise nanocomposite particles, such as, but not limited to, block copolymer nanocomposite particles, terminal and site specific-functional nanocomposite particles, functional gradient (co)polymers and functional colloids comprising reactive groups.

The present invention provides a method of producing a nanocomposite particles comprising a particle core with a uniform polymer tethered to the particle core. The method comprises using a colloid as a initiator in the polymerization process. The particles of the colloid used in the method of the present invention include a functional group having an initiation site capable of initiating a polymerization process, such as, but not limited to a radical polymerization. Preferably, the polymerization process is a controlled or living polymerization, such as, for example, atom transfer radical polymerization ("ATRP") or stable free radical polymerizations ("SFRP"). When the functional groups comprise radically transferable atoms or groups, the colloids are suitable for use as multifunctional nanoparticle initiator species for the synthesis of nanocomposite particles by controlled polymerization of radically (co)polymerizable monomers by atom transfer radical polymerization. As used herein, a nanoparticle is a microscopic particle whose size is measured in nanometers. If the radically transferable atom is a halide, the halide may be converted into an alkoxyamine suitable for initiation of a stable free radical mediated polymerization (SFRP), alternatively known as nitroxide mediated polymerization (NMP) such as the process disclosed in U.S. Pat. No. 5,910,549 or by the improved process disclosed in application Ser. No. 09/359,591; both herein incorporated by reference. One skilled in the art will understand that there are additional methods to produce functionalized colloids or nanoparticles for initiation of SFRP.

ATRP and SFRP are controlled polymerization processes wherein the reaction characteristics depend on an equilibrium between an active polymerization species and a dormant species. The equilibrium of the reaction results from the presence, of a persistent radical effect, therefore, both processes can polymerize radically (co)polymerizable monomers. The radically (co)polymerizable monomers can be (co)polymerized in any sequence and into many topologies, can comprise multiple site specific functional groups, and form blocks of functional monomer units, such that, for example, macrophylicity or amphiphylic character is introduced to the material. The process and product parameters discussed in detail below for ATRP, also apply to SFRP, as well as other polymerization processes. One skilled in the art may without undue experimentation determine an appropriate nitroxide for incorporation on the colloidal particle that will allow polymerization of the desired monomers based on the knowledge available in the art. The nanocomposite particles produced from the preparation of functional colloid based initiators and controlled radical polymerization comprise a range of novel nanocomposite particles, that are capable of, for example, self-organization in nanocomposite structures, forming nanoenvironments for crystalline growth and are capable of subsequent modification to respond to external environmental stimuli.

As used herein, "controlled polymerization" means that in the polymerization process chain breaking reactions are insignificant compared to chain propagation reactions, and the resulting polymers were produced with molecular weight control, narrow polydispersity, end-group control and the ability to further chain extend.

One aspect of the invention is directed towards the preparation of nanocomposite particles with a silicon based particle core having an attached or tethered polymer comprising free radically (co)polymerizable monomer units. One method of the present invention for producing such nanocomposite particles involves use of a functional colloid comprising polymerization initiation sites. The functional colloids may comprise functional silica particles and silicate based particles, including, but not limited to, polysilesquioxane colloidal particles possessing initiating groups for ATRP. Preparation of such particles and the use of such nanoparticles as multi-functional initiators for polymerization process to produce particles with tethered or grafted polymers is taught herein.

During the preparation of silica based particles with attached initiator groups, in order to avoid coagulation, a solvent switch technique is taught whereby one can prepare well separated, redispersible silica particles with particle sizes between 5 and 1000 nm, preferably particles having diameters between 10 and 50 nm, comprising functional initiator groups on the surface on the surface of the particles. Nanoparticles with monomodal narrow particle size distributions produce more uniform nanocomposite structures, in most cases. Preferably, a distribution of particles wherein 67% of the particles are within 10% of the mean is a narrow particle size distribution and will produce a substantially uniform nanocomposite structure. When the grafted or tethered polymer, comprises a block copolymer that can undergo phase separation based on the composition of the polymer block, the nanocomposite particles prepared exhibit a self-organized phase separated nanocomposite structure. One such structure can be compared to a spherical polymer brush, one which has a particle core and is concentrically enveloped with a first tethered polymeric block and then concentrically enveloped by a second tethered polymeric block. Since, preferably, the preparation of each component of the structure is controlled, the relative ratio in weight and volume of particle core to first tethered block and the first tethered block to the second tethered block, or "skin", are fully variable and predeterminable. As used herein, "predeterminable" means that the length of each block, and hence the volume occupied of each phase, can be determined from the number of attached initiating sites and the number of moles of each monomer converted to tethered polymer. The physical properties of each block can be tailored for specific applications, such as, for example, one can form a first block of a low $T_g$ polymeric block and second block of a high $T_g$, thereby forming an individual nanoparticle with properties that may be controlled with temperature and in some instances form a nanocomposite particle with a hard skin and a compressible layer under the skin.

A further benefit of forming tethered or attached block copolymers is that it allows size control of the nanocomposite particle or nanocomposite structure and solubility control to the silica particles. Furthermore, using the preferred controlled polymerization processes, the range of materials prepared in cited commonly assigned patents and applications can be prepared as tethered (co)polymers, including, but not limited to, amphiphylic block copolymers, tethered ABC block copolymers, (hyper)branched copolymers, and block copolymers with blocks additionally comprising reactive functionality for subsequent intra-block, inter-block and inter-particle reactions.

The present invention is also directed towards a method of preparing nanocomposite particles directly from polymers with reactive silicon comprising segments. Such a polymer is herein exemplified by the formation of an AB block copolymer comprising segments formed by consecutive ATRP (co)polymerizations, such as, the initial formation of a poly-n-butyl acrylate macroinitiator followed by ATRP of 3-(dimethoxymethylsilyl)propyl acrylate. See FIG. 1a. Such a block copolymer undergoes phase separation in solution to form colloids, or can phase separate on surfaces to form 3 dimensional arrays, the silicon comprising segments may then be cross-linked to form the inorganic core of the nanocomposite particle. Resulting in an inorganic core with tethered polymer chains.

Figure 1B:
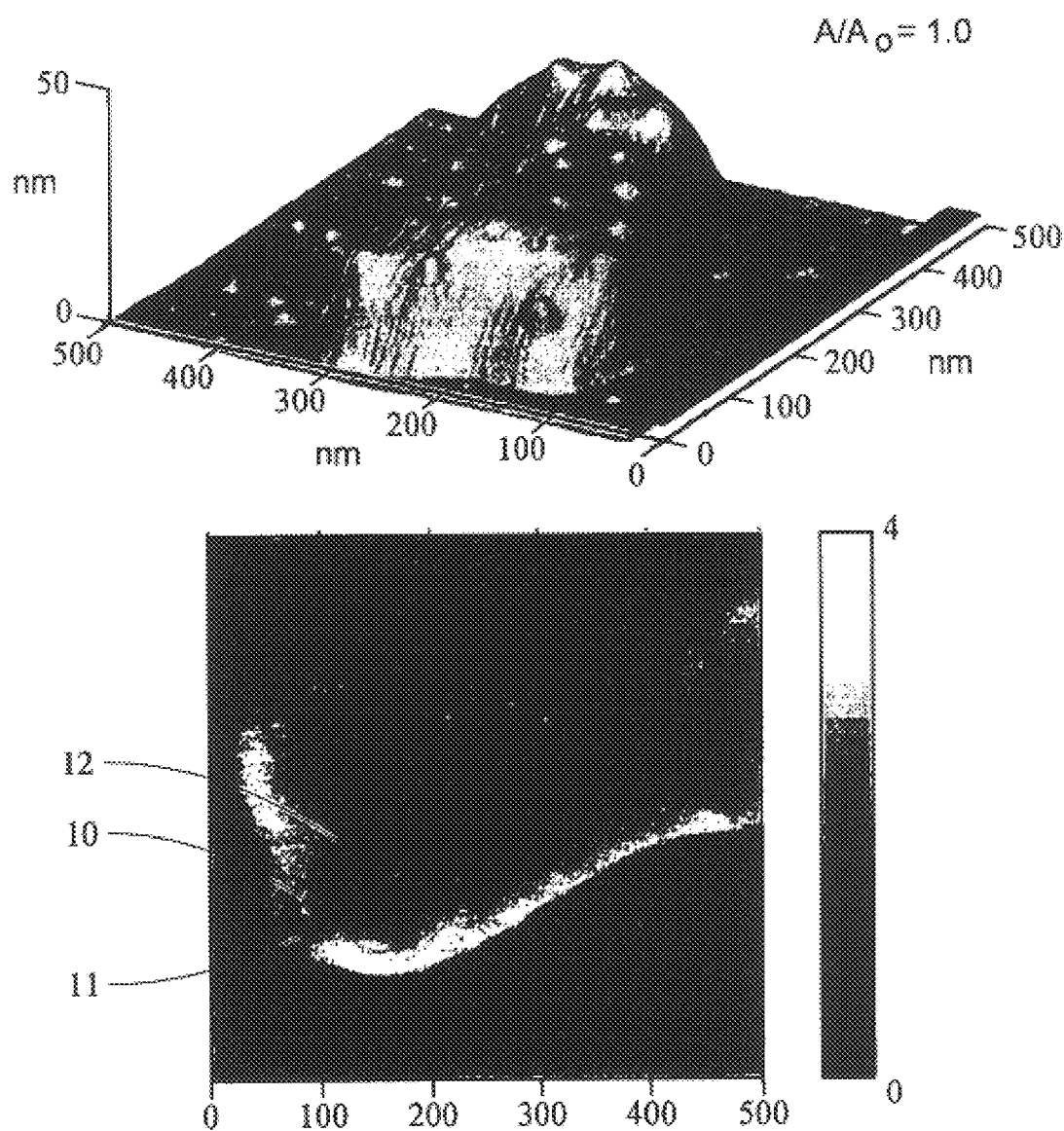
FIG. 1b is a AFM image of nanocomposite particles including an inorganic core and a tethered AB block copolymer comprising a poly polystyrene block and a polybenzyl acrylate block.

In one specific nonlimiting example, shown in FIG. 1b, a core-graft-(pS-block-pBZA) composite particle is shown in the Atomic Force Microscopy (AFM) image, the inorganic core 10 is seen in the to be enveloped by a first concentric phase 11 separated polymeric material with the ultimate matrix material being a second polymeric phase 12 comprising the monomer units further from the particle core. Since these nanocomposite materials have been prepared by a controlled polymerization process, they retain a substantially spherical shape and possess terminal functionality that may facilitate cross linking reactions, be converted into different reactive functional groups, or to more stable groups, whichever is desired.

The morphology of a concentric phase separated structure depends on the relative volumes of the phases, or blocks, in the copolymer and the core particle. The volume fraction of the polymer phases can be modified in solution by external stimuli; such as, by phase selective solvents, such as, for example, polar or nonpolar solvents. Such factors effect the ultimate morphology and organization of the composite as it is cast, or deposited, including deposition by sedimentation, from various solvents and under various drying conditions. At different volume ratio's of phases, a network can be constructed comprising a dispersed inorganic phase and a dispersed organic phase in a matrix comprising the first tethered (co)polymer. Such a material would be a thermoplastic equivalent of the thermoset chain extended bulk material, described above.

In addition, the $T_g$'s, and phylicities, as well as other properties, of the components of the nanocomposite particle can be controlled through selection of monomers or post-polymerization reactions, such that nanocomposite structures can find utility as, for example, pressure sensitive adhesives, components for reinforcing elastomeric materials, reinforcing agents for glassy polymers where they can act to suppress crazing, or high performance self reinforced resins, as well as other applications, which will become evident to one skilled in the art with knowledge of the present invention.

In addition to the terminal functionality of the nanocomposite particles and structures, functionality may be incorporated into the nanocomposite particles and structures by polymerizing monomer units bearing specific functional groups. It may be advantageous to introduce functionality into the molecule by the polymerization of monomers comprising a protected functional group that may be deprotected after polymerization. A block copolymer comprising a particle-graft-(poly-t-butyl acrylate-b-polystyrene) copolymer, that forms a particle-graft-(polyacrylic acid-b-polystyrene) after deprotection, is exemplary of such a copolymer. A further application may utilize a particle tethered amphiphylic block copolymer which can be selectively solvated with solvents comprising salts which on drying will form controlled constrained nanoenvironments for the crystallization of the salts. Another application is envisioned for a novel particle-graft-oleophylic-b-hydrophylic nanocomposite particle; the first tethered block can act as the solvent for the deliverable material, such as, for example, drugs or cosmetic aids can be encapsulated within the second tethered polymer block acting as a biocompatible "skin" for the first tethered block. The second tethered block may comprise a copolymer composition that may controllably release the encapsulated material from within the domains of the first tethered block.

The present invention provides processes for the preparation of such nanocomposite materials. Specifically for ATRP, a process of the present invention comprises first polymerizing one or more free radically polymerizable (co)monomers in the presence of an initiation system and, further polymerizing one or more second radically polymerizable (co)monomers. The initiation system comprises a functional particle initiator and a catalyst. The functional particle initiator may comprise, for example, a silica particle or a silicate particle or a polysilsesquioxane particle and an attached functional group comprising a radically transferable atom or group. The catalyst may comprises a transition metal complex that participates in a reversible redox cycle with at least one of the attached functional groups and an attached compound having a radically transferable atom or group, such as, the growing polymer chain. The monomers available are any free radically (co)polymerizable monomers and may comprise functional monomers which produce polymers or polymeric blocks that comprise, for example, hydrophilic or hydrophobic properties, indeed segments with any selection of phylicities, including segments comprising reactive, stimuli responsive and/or crosslinkable units. In the preparation of high molecular weight tethered grafted polymer chains, the ratio of transition metal to radically transferable atoms of groups can be increased to ratio's greater than one in order to increase the rate of polymerization while allowing the polymerization to be conducted at high dilution. Conducting polymerizations at high dilution reduces the likelihood of interparticle coupling reactions.

Since the preferred polymerization processes used in the preparation of these nanocomposite particles are controlled polymerization processes using a reactive end group to control the polymerization, the reactive end group may be available for transformation into another end group after the desired polymer is formed. The reactive end group may be utilized to prepare nanocomposite particles and structures that act as reactive nanofillers capable, in a non-limiting example, of reacting with unsaturated elastomers/rubbers. One such transformation would be for an azide reactive end group or to convert the reactive end group into an azide group. A nanocomposite particle with an azide end group may be converted directly into chain extended bulk materials by sufficient input of energy to decompose the azide end group. This is exemplified by preparation of poly (styrene) composite nanoparticles possessing bromine end groups that were converted into azide end-groups. The azido functional nanostructures were targeted to be capable of reacting with unsaturated elastomers/rubbers.

The present invention also includes processes for the preparation of functional colloids. One method for the preparation of a functional colloidal particle suitable as an initiation species for controlled polymerization is presented in FIG. 1a. The process of FIG. 1a is for the production of a 2-bromoisobutyryl functional polysilsesquioxane colloid, it should be understood that this example does not limit the present invention and any group capable of initiating a polymerization process could be utilized as the attached initiator species.

Earlier applications; U.S. application Ser. Nos. 09/359, 359 and 09/534,827, described aspects of the preparation and use of a silica particle prepared by the Stober process wherein a tetraorthosilicate is controllably hydrolysed and self-condenses to form particles. The size of the particle produced by the Stober process is tunable between the ranges 10–1000 nm in dispersions of ethanol, other polar solvents, or in aqueous basic solutions such as ammonium hydroxide. Stober particles, as particles produced by the Stober process are known, in alcohol dispersion, or alcosols, are kinetically stabilized by electrostatic forces, generated by negative charges from ionized surface silanol groups. Thermodynamically stable particles may be prepared by condensation of these surface silanol groups on the Stober particles with a monoalkoxysilane. If the monoalkoxysilane incorporate additional functionality attached to, for example, the alkoxy group, the condensation reaction will incorporate functional groups onto the particle surface to produce, for example, a polymerization initiation site.

The particles may be produced with narrow particle size distributions and a certain amount of functional groups attached to the particle surface. The number of functional groups incorporated on the particle may be controlled by the mole ratio of initiator functional silane to non-functional silane used in the process as well as by other methods known to one skilled in the art. Alternatively, the amount of functional groups may be controlled by sequential reaction of the functional silane and a nonfunctional silane. Such functional silica particles may be used in the same manner as the mesoscopic organopolysiloxane particles described below to prepare silica tethered nanocomposite particles.

A process for the incorporation of benzyl halide groups on Stober particle was described in U.S. application Ser. No. 09/534,827 now pending and followed published procedures for preparation of Stober particles except for additionally comprising the direct addition of a functional monoalkoxysilane, (3-(2-bromoisobutyryloxy) propyldimethyethoxysilane), to the alchosol. However, due to the hydrophobicity of this substituted monoalkoxysilane, coagulation of colloidal silica resulted upon addition of the silane. This tendency towards coagulation can be circumvented through the use of a solvent switch technique of the present invention. In the solvent switch technique, the colloid may first be diluted with, and then resuspended in a non-polar solvent, which would include ethers, ketones and cyclic ethers such as dioxane, and the original and more volatile solvents, such as ethanol and water are then removed prior to functionalization of the particle. Thus, particle aggregation is avoided by first suspending colloidal particles in dioxane, followed by functionalization of the particle surface by addition of a reactive silane comprising a second functional group capable of initiating a polymerization process. After the particle surface is functionalized to the desired degree, an excess of hexamethyldisilazane may then be added to consume any remaining residual silanol groups. Stable, dispersable particles containing an attached functional group capable of initiating an ATRP reaction, for example, may then be isolated. Characterization of such surface functional Stober particles was conducted by elemental analysis, dynamic light scattering (DLS) and AFM prior to use of the particles as inorganic colloidal initiators for ATRP. If desired, functional particles containing an attached halide group can be converted to an initiating group for SFRP by use of procedures described in commonly assigned U.S. Pat. No. 5,910,549, or by the improved process disclosed in application Ser. No. 09/359,591 now U.S. Pat. No. 6,512,060, both herein incorporated by reference.

The present invention also includes the synthesis of inorganic colloidal initiator particles by preparation of nanoscopic organopolysiloxane particles. A process for the preparation of nanoscopic organopolysilxane particles with chemically bound metallic compounds is described by Baumann, F.; Deubzer, B.; Geck, M.; Dauth, J.; Schmidt, M. Adv.Mater 1997, 9, 955; and by the same authors in U.S. Pat. No. 6,008,309; both of which are herein incorporated by reference. In contrast to the teachings of U.S. Pat. No. 6,008,309 wherein the preparation of particle supported transition metal catalyst is taught, processes or the present invention for the preparation and use of particles with attached polymerization initiation sites are taught. In further contrast to the U.S. Pat. No. 6,000,309 patent wherein the mesoscopic organopolysiloxane particle is destroyed during the polymerization process, the particle functionalized as an ATRP initiator becomes an integral part of the resulting nanocomposite particle or structure.

The synthesis of the inorganic colloidal initiator particles may conducted in a solvent such as, for example, tetrahydrofuran (THF). The initiator particles produced by this process were capable of being isolated and, subsequently, redispersed. It may be desirable to conduct only a partial initial surface treating reaction with a surface treating agent comprising the desired functionality than described in the literature to provide particles with remaining residual reactive surface sites. These sites are then able to react in a second surface treatment with molecules capable of incorporating a second functional group suitable as a functional group for initiating ATRP, for example. As used herein, a surface treating agent is a molecule, such as a monoalkoxysilane, which will react with the particle surface. The surface treating agent may incorporate desired functionality or be used to stabilize the particle surface. In the examples described later, substantially uniform particles with diameters between 15–20 nm and 1000 initiation sites on the surface were prepared. The number of initiating sites can be varied by varying the ratio of the surface treating agents and could vary from an average of one up to 1,000,000 or more depending on particle size and initiation site density; exemplary particles with 300 to 3000 initiating sites were prepared, however this range can be expanded using the methods described herein if desired. It is expected that the preferred number of functional groups on each particle would be in the range of 100 to 100,000, and more preferably in the range of 300 to 30,000 to produce the advantageous properties of the nanocomposite particles and structures. Control over the number of initiating sites on a particle allows one to control the graft density of the attached polymer chains and thereby the packing density of the polymer chains. A high density of initiating sites provides for maximum incorporation of grafted polymer chains and, as described below in the examples, such high graft density provides tethered chains that are in an extended, brush-like state. Whereas a loose packing density can be employed and provides tethered chains that may assume a coiled conformation at higher molar mass. Such a coiled chain formation may be employed when one wishes to use the first attached block copolymer as a medium for further incorporation of occluded materials such as drugs or cosmetics for subsequent controlled delivery.

ATRP of styrene was conducted using the 2-bromoisobutyryl-functionalized organopolysiloxane particles as initiators in Example 2. The hydrodynamic volume of the colloid particle increased after conducting the ATRP of styrene indicating that particle tethering polymerization, or surface initiated polymerization had occurred forming a tethered polymer on the initiator 2-bromoisobutyryl-functionalized organopolysiloxane particles. In the examples provided herein dynamic light scattering (DLS) and atomic force microscopy (AFM) analysis were utilized to confirm the synthesis of discrete particles with tethered polymers. This SEC result was further confirmed by DLS where the hydrodynamic diameter also was found to have increased by approximately 10 nm.

A block copolymer was then prepared using the polystyrene tethered nanocomposite particle as a macroinitiator for the ATRP of benzyl acrylate monomer as shown in FIG. 1a. SEC of the copolymer showed that a dramatic increase in the hydrodynamic volumes occurred during the block copolymer synthesis. Examination of the AFM image of the block copolymer particle also confirmed that grafting reactions had occurred and that nanocomposite particle grafted block copolymers had been prepared. When the nanocomposite particles were cast into a film, the particles and tethered copolymers packed hexagonally onto a surface and were spaced with a periodicity dependent on the molar mass of the grafted polymers. In an AFM image of the composite particle, See FIG. 1b, the inorganic core particles 10 are observed as dark black spots spread into a light matrix of the tethered poly(benzyl acrylate). Of particular interest is the presence of dark halos 11 around the inorganic core particles 10 seen in FIG. 1b these are believed to be the polystyrene segments of the surface tethered graft block copolymers. This infers that the core particle and the grafted or tethered block copolymers phase separate in a concentric fashion. Such a result has not been previously reported and represents a novel approach to further nanoscale engineering, or nanoscale patterning. The morphology of the nanocomposite particles and structures may be controlled by the molecular weight of each attached polymer block, the residual functionality incorporate on the particle core, the functionality on the monomer units, crosslinking of the tethered polymers, and by use of phase selective solvents during casting or formation of the films, as well as other methods known in the art. Such tri-phasic materials would be expected to display interesting diffraction patterns when allowed to self assemble by deposition techniques into three dimensional arrays. Since the tethered (co)polymers retain terminal functionality, the nanocomposite particles may be reacted with each other or with additives during or after formation of thick or thin films to produce an extended stable nanocomposite structure, for example.

During AFM examination of the polysilsesquioxane-graft-(polystyrene-block-polybutyl acrylate) particles it was noted that the particles behaved as elastomeric materials. The particles showed a tendency to recover their original shape after removal of the AMF tapping forces.

In order to confirm that a controlled polymerization had occurred from the particle surface, the particle initiated block copolymer chains were cleaved from the core particle by treatment with hydrofluoric acid in toluene using a phase transfer catalyst. Two samples of polymer chains were cleaved from the particles cores, the first sample was of homopolymer polystyrene tethered composite nanoparticle, and the second sample was the AB block copolymer nanocomposite particle prepared by polymerizing benzyl acrylate from the polystyrene tethered composite nanoparticle. SEC chromatograms of the cleaved polymers revealed polymers with monomodal molecular weight distributions. Monomodal molecular weight distributions indicate controlled polymerization had occurred from the particle surface. The polystyrene chains obtained from the first sample were of low molar mass and low polydispersity, indicating high efficiency for the initiation of the polymerization of styrene from each of the attached initiator sites on the functionalized particle. However, the cleaved AB block copolymer possessed both a low molar mass tail and a high molecular weight shoulder, indicating that a limited number of the growing chains had undergone termination reactions, but that a controlled polymerization of the benzyl acrylate monomer had occurred. Procedures for additional control over cross propagation reactions and copolymerizations have been taught in the commonly assigned applications cited and incorporated by reference herein.

The broad utility of this approach to nanocomposite particle structures is further demonstrated by the particle surface initiated polymerization of a series of alkyl acrylates. A benzyl acrylate homopolymer tethered to a particle core was also prepared. An AFM image, FIG. 3, of the homopolymer benzyl acrylate tethered composite nanoparticle indicates dark areas corresponding to the core particles 31 surrounded by white areas of the homopolymer benzyl acrylate 32. When compared with the AFM image, FIG. 1b, of the block copolymer of styrene-block-benzyl acrylate, it becomes clear that the dark halos 11 around the particle core 10 are due to the polystyrene block of the copolymer.

Figure 4A:
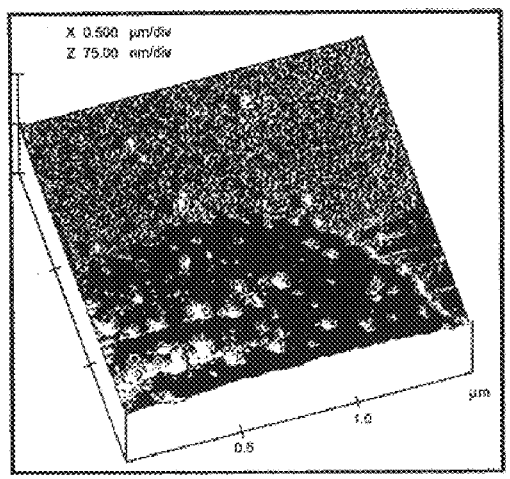
FIG. 4a is a AFM height image of nanocomposite particles including an inorganic core and a tethered poly(butyl acrylate) block poly(styrene) copolymer.
Figure 4B:
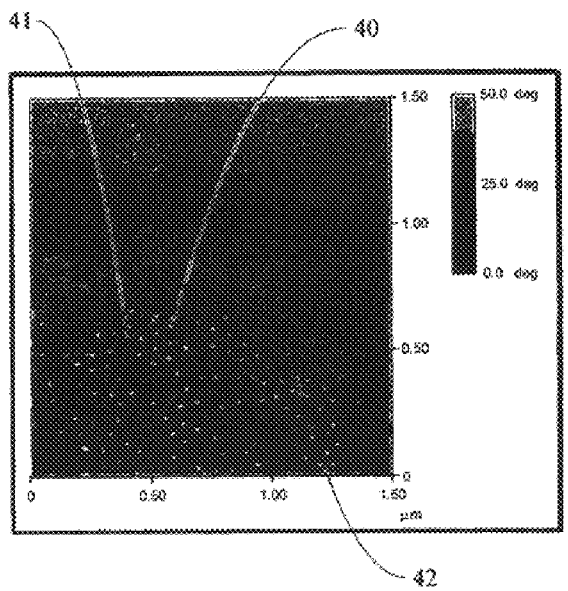
FIG. 4b is an AFM phase image of nanocomposite particles including an inorganic core and a tethered poly(butyl acrylate) block poly(styrene) copolymer.

A described production of the styrene-block-benzyl acrylate AB block copolymer tethered to core particle, a hard-soft AB block copolymer-graft-particle nanocomposite particle, was prepared using nanoparticle initiators for the ATRP of n-butyl acrylate followed by chain extension of this tethered polymer nanocomposite particle multi-functional macroiniator with styrene. This process forms, at the appropriate mole ratio of block segments, a low Tg polymer segment attached to the core, the polybutylacrylate polymer segment and a high Tg shell, the polystyrene polymer segment, nanocomposite particle. Monolayers of this exemplary model composite nanoparticle on mica were analyzed by AFM, FIGS. 4a and 4b, revealing the presence of distinct domains of each of the copolymer segments around the core particle 40. In particular, in these AFM phase images, the dark halos 41 in AFM image are due to the tethered polybutyl acrylate, p(BA), are clearly observed around lighter particle cores 40 in a light continuous phase 42 of polystyrene, p(Sty). The AFM height and phase images of the particle-graft-(p(BA)-b-p(Sty)) composite showed that a uniform spacing of structures was achieved. A narrow size distribution of the initiator particle produces nanocomposite particles which will form structures with more evenly spaced cores. As expected, compressibility of this particular particle monolayer from the AFM cantilever was not significant due to the high content of glassy p(Sty) in the matrix of the ultrathin film.

A particle-tethered-p(BA)-b-p(Sty) composite with a shorter length, or lower molecular weight, p(St) block was also prepared. AFM imaging and subsequent inspection of the particles determined that the thin rigid shell could be deformed under a force but would return substantially to the original shape after the force was removed. Such recoverable deformable nanocomposite materials should find wide application as, for example, as lubricants or lubricant additive or as tailorable vibration dampening media, for example. These particles with a low molecular weight outer shell of a polystyrene behaved as individual nanocomposite particles due to the presence of a resilient outer polymer shell.

In the following examples, the preparation of grafted or tethered AB block copolymers from functional core particles by conducting controlled polymerization from the surface attached functional groups and further initiating controlled polymerization of a second block (co)polymer is described. Control over the polymerization by the use of a controlled polymerization process for the preparation of each block has been confirmed by cleaving the tethered polymers analysis for polydispersity. As described in detail in the applications cited herein, the radically transferable atom or group present of the growing polymer chain end can be converted into another group for long term stability of the nanocomposite particles or structures; or converted into a different functional or reactive group suitable for further applications or crosslinking. The radically transferable atom or group may be used to prepare further attached block copolymer segments resulting in attached ABA block copolymers or attached ABC block copolymers or any other desired combination of blocks. Since atom transfer radical polymerization is a living polymerization process, the chains may be extended whenever additional monomer is added.

It is advantageous to confirm and measure the number of attached initiator functional groups prior polymerization of the multifunctional initiator particles for construction of nanocomposite particles or structures. One approach to determining the number of initiation sites per particle, was demonstrated by use of bithiophene-chlorosilane in the synthesis of the functional particle. The bithiophene groups act as UV-absorbing chromophores. The immediate advantage was the ability to confirm the incorporation of bithiophene groups to the particle, and, therefore, incorporation of radically transferable atoms, by online UV detection in SEC measurements. Such a confirmation could not be done directly for 2-bromoisobutyryl-chlorosilanes treated particles due to the absence of UV-absorbing chromophores or other readily observable functional group. This incorporation of a light responsive functionality into the structure further demonstrates the relative ease with which external stimuli responsive, self assembling, structures can be constructed. One skilled in the art will readily understand that other functional groups may be incorporated onto the surface of the functionalized particle which will respond to additional external stimuli, such as, for example, solvents, heat, moisture, electric current, sound or other chemicals, such as dihydroxy compounds.

Figure 5:
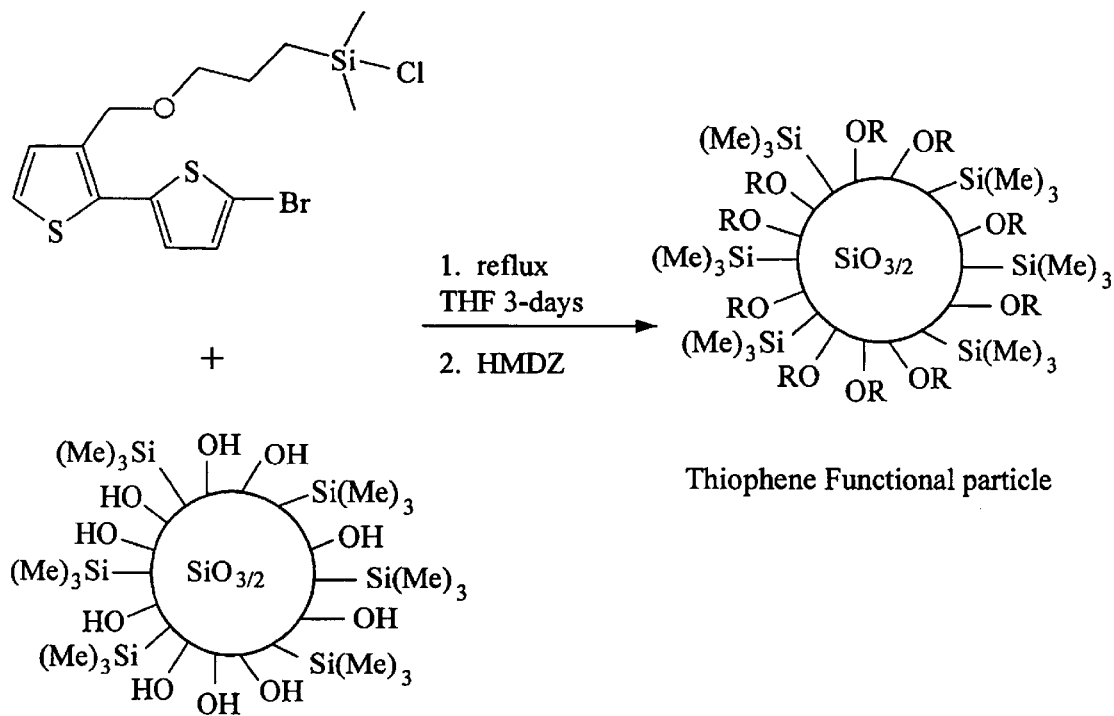
FIG. 5 is a diagram of the process for synthesis of bithiophene functional nanocomposite particles capable of initiating the polymerization process of the present invention.

The synthesis of bithiophene functional particle was conducted as a first step toward the preparation of poly (thiophene)/particle nanocomposites. Bithiophene groups were attached to the particle surfaces by the reaction of a bithiophene-chlorosilane with silicate particles after treatment with a monoalkoxysilane and resuspension in tetrahydrofuran, as shown in FIG. 5. Analysis confirmed that discrete particles had been prepared, functionalization of the particle was confirmed spectroscopically and polymerization from the particle surface was successfully performed. This example of incorporation of functional groups responsive to external stimulation is exemplary of the multiplicity of site specific responsive functionality, including photoresponsive groups, that can be built into such structurally controlled composite materials as disclosed herein.

Reactive groups may also be incorporated into the polymers by selection of monomers with the desired functional groups or by post polymerization reactions. The other process for production of structurally, well defined polymer-nanocomposite particle is preparation of a reactive block copolymer that will self-organize in solution or on a substrate and then crosslink the reactive block to stabilize the self organized structure. Synthesis of one such reactive block copolymer was conducted by using a pnBA macroinitiator for the ATRP of 3-(dimethoxymethylsilyl)propyl acryate. Previously, a gradient copolymer of p(BA-b-DMSA) had been prepared, with a very high content of pDMSA relative to pBA, by sequential addition of nBA after high conversions in a DMSA in standard ATRP. The opposite approach was taken and is taught herein to ensure that the formed block copolymer would form micelles. A well-defined pBA segment ($M_n$~25 k) of predetermined molar mass and functionality was used as the macroinitiator. The desired polymer was a block copolymer with a very small content of pDMSA, which would undergo phase separation and allow crosslinking of the formed pDMSA domains to yield hairy microgels with pBA tethered chains. Conditions used in the synthesis are given below.

EXAMPLES

Production of Initiator Functionalized Particles

Example 1

Synthesis of 2-Bromoisobutyryl Functionalized Particles

Figure 2:
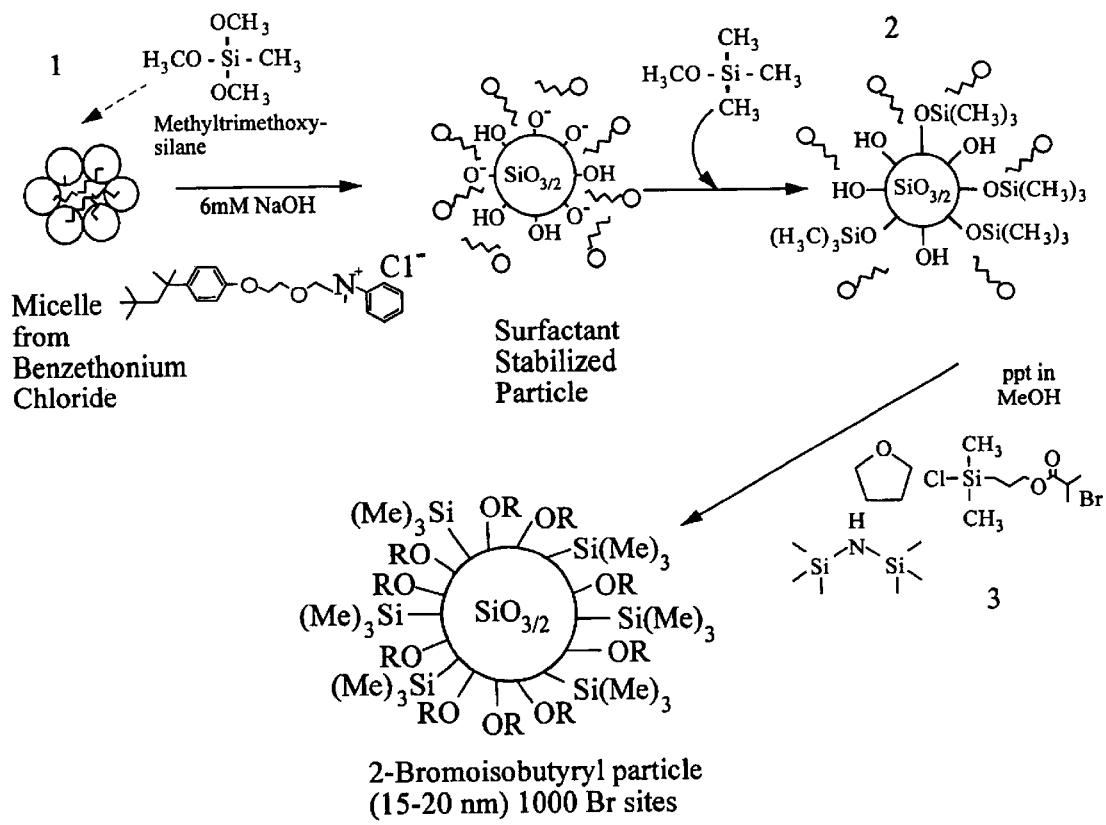
FIG. 2 is diagram of the process for synthesis of 2-bromoisobutyryl functional particles capable of initiating the polymerization process of the present invention.

2-Bromoisobutyryl functionalized particles were prepared for use as polymerization initiators. Conditions for the synthesis are shown in FIG. 2. In a series of experiments, it was found that the first deactivation step 1 of the particle surfaces with trimethylmethoxysilane in the aqueous phase was the key step in recovering soluble particles. Typically, after surface treatment of particles with the monoalkoxysilane 2, the particles were recovered by filtration after precipitation into methanol (10-fold excess). When the filtrate was allowed to completely dry in air, the resulting white powder would often be insoluble in organic solvents, such as toluene or tetrahydrofuran. However, when the filtrate was taken as a wet slurry and immediately resuspended in reagent grade tetrahydrofuran (THF), the particle were consistently able to be dissolved or be dispersed in the solvent. Functionalization of particles 3, was then carried out by reaction of the particles first with 3-(2-bromoisobutyryloxy) propylchlorodimethylsilane 3 followed by passivation of the surface by further reaction with hexamethyldisilazane to yield thermodynamically stable colloids. Purification of particles was first conducted by precipitation into methanol, dialysis for 10 days using RC membranes in acetone.

Figure 6:
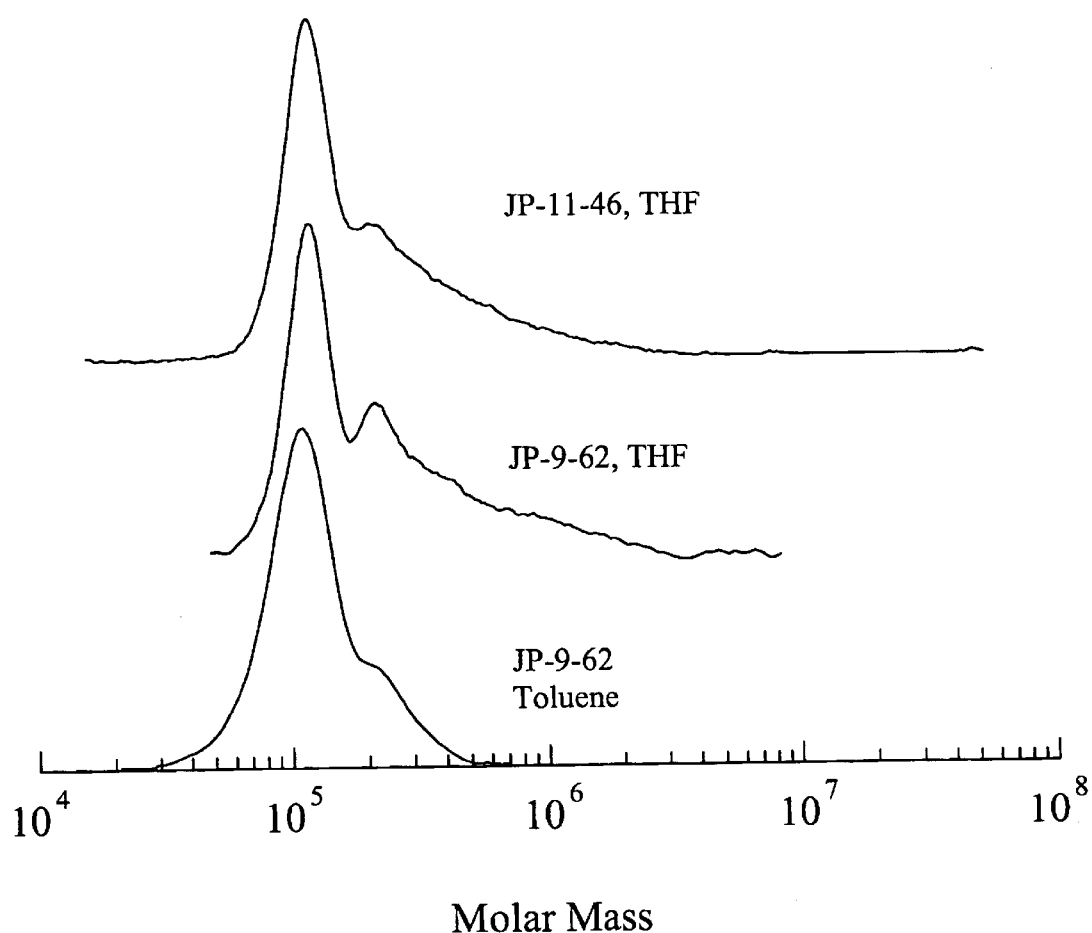
FIG. 6 is a comparison of the graphs produced by SEC of 2-bromoisobutyryl particles from scaled up synthesis in toluene and THF.

The procedure comprised the following: methyltrimethoxysilane (4.6 mL, 26 mmol) was added slowly over a 45 minute period to a solution of 6 mM NaOH (25 mL) and benzethonium chloride (0.6 g, 1.3 mmol) and then allowed to stir for 5 hours. Methoxytrimethylsilane (2.4 mL, 17.4 mmol) was then added and the reaction was allowed to proceed overnight. The reaction mixture was then precipitated into methanol, and the solid was recovered by filtration. The wet, white slurry was then resuspended in THF (40 mL) and (3-(2-bromoisobutyryloxy)propyl) chlorodimethylsilane (3 mL), yielding a slightly turbid dispersion and was refluxed for a four day period. Hexamethyldisilazane (3.0 mL, 14.2 mmol) was then added and the reaction allowed to reflux overnight. A white precipitate was observed and was removed by gravity filtration. Additional hexamethyldisilazane (1.0 mL, 4.7 mmol) was added and the dispersion refluxed for an additional day. Particles were recovered by precipitation into methanol and filtration (yield 2.6 g). One gram of the particles were put into a RC dialysis membrane bag and allowed to stir for 4 days in acetone. Particles were then precipitated by addition to methanol (MeOH) and recovered by filtration. Particles were then resuspended in acetone(100 mL)/THF (60 mL) and MeOH (200 mL), followed by the dropwise addition of deionized (DI) water(~20–30 mL). A white powder was recovered by filtration (0.45 g). The particles were very soluble in THF, acetone, n-butyl acrylate and the resulting solutions passed through a 0.2 micron PTFE filter. The particles are also slowly dissolvable in toluene, and chloroform but left a residue that could be removed by filtration through 0.2 micron PTFE filter. SEC image of the biothiophene particles in toluene and THF is shown in FIG. 6.

Dynamic light scattering (DLS) was also conducted on the particles to prove that relatively monodisperse silicates had been synthesized. DLS was conducted at 45°, 90°, and 135° to ascertain whether particle diameters exhibited an angular dependence. For monodisperse spheres, particle sizes remain independent of angle. The particle size of the silicate networks was calculated using both CONTIN and NNLS methods. When plotted using intensity (CONTIN (I), or NNLS (I)), particle size values were inflated due to skewing of light scattering intensities toward larger particles. However, when plotting number distributions, particle sizes fall in the range between 13–20 nm, which agreed with diameters observed from TEM.

TABLE 1

Dynamic Light Scattering Results of Scaled-up synthesis

|  | Contin (I) | NNLS (I) | Contin (#) | NNLS (#) |
|---|---|---|---|---|
| JP-9-62, 45° | | | | |
| Eff. Diameter | 25.7 nm | 190.2 nm | 22.5 nm | 19.0 nm |
| Rel. variance | 0.028 | 12.8 | 0.016 | 0.045 |
| JP-9-62, 90° | | | | |
| Eff. Diameter | 28.0 nm | 30.5 nm | 13.0 nm | 15.4 nm |
| Rel. variance | 0.089 | 0.055 | 0.100 | 0.054 |
| JP-9-62, 135° | | | | |
| Eff. Diameter | 30.5 nm | 32.7 nm | 15.4 nm | 21.3 nm |
| Rel. variance | 0.195 | 0.142 | 0.047 | 0.014 |

(DLS measurements were conducted in toluene (1 mg/mL), at 24° C.)

1a. Optimization of Synthetic Conditions for Polysilsesquioxane Particles

Investigation into aggregation phenomenon in the synthesis of polysilsesquioxane particles was conducted. Previously, 2-bromoisobutyrate functional $SiO_{1.5}$ particles were successfully synthesized on a 2 g scale, with a minimal degree of aggregation, as determined by SEC/DLS in toluene. However, synthesis of particles on a 5 g scale revealed that aggregation had occurred, as determined from SEC in THF. Particles which previously possessed minimal aggregation (JP-9-62), and another batch of aggregated particles (JP-11-46) were compared under the same SEC conditions in THF. From SEC in toluene, using $10^5$, $10^2$ Å PSS Styragel columns, examination of particles (JP-9-62) showed the presence of a small high molar mass shoulder, indicative of a small degree of aggregation. SEC of the same batch (JP-9-62) in THF using $10^6$, $10^5$, $10^4$ Å Pss Styragel columns revealed that a significant degree of aggregation was present. Comparison with another batch of particles (JP-11-46) in THF indicate that the same degree of aggregation was present, as in the previously successful batch (JP-9-62). See FIG. 6. These differences may be due to changes in hydrodynamic volumes in various solvents and the use of columns with higher resolution at the high molar mass regime. More importantly, these comparisons of particles in different solvents for SEC imply that the conditions for the particle synthesis are satisfactory, and that the same degree of aggregation in small vs. larger batches is maintained.

1b. Purification of 2-Bromoisobutyrate Particles

An improvement in the purity of particles was achieved by the use of ultrafiltration. Typically, 2-bromoisobutyrate functional particles possessed an unquantified amount of untethered 2-bromoisobutyrate compounds physi-adsorbed to the particle surfaces. These untethered impurities are problematic in polymerization reactions, as free molar mass polymers can be formed in addition to the desired nanocomposite particles. The conditions for the ultrafiltration experiment to purify particles were the following: approximately 3 g of crude particles were dissolved in a solution of toluene (150 mL) and methanol (100 mL). The colloidal dispersion was passed through a RC cellulose filter in a ultrafiltration stirred cell at 30 psi over a period of two hours. The dispersion was concentrated to a volume of 50 mL and decanted from the stirred cell. Particles were recovered by reducing the volume of the dispersion to 10 mL and precipitation into MeOH (200 mL).

Elemental analysis of particles before and after ultrafiltration indicated a reduction of bromine content. This is consistent with the efficient separation of untethered initiator species which contained 2-bromoisobutyrate moieties. Additionally, a reduction in the carbon and hydrogen content indicated that carbon-based compounds were removed from the system. A true theoretical value for the C, H, and Br content was difficult to quantify as the number of surface bound 2-bromoisobutyrate groups was not easily determined. However, the carbon content for only the particle core of $SiO_{1.5}$ was approximately 13%-C. Thus, for the purified particle, a carbon content of 17-mass % was still reasonable.

Analysis for nitrogen was also done to quantify the presence of residual surfactant which was used in the particle forming reaction (i.e., benzethonium chloride). The reduction in nitrogen content further supports the successful purification of colloidal initiators using ultrafiltration.

Before ultrafiltration: C-22.01%, H-5.25%, Br-4.78%, N-0.05%

After ultrafiltration: C-17.13%, H-4.82%, Br-3.31%, N-none

Example 2

ATRP of Styrene Using the 2-bromoisobutyryl-functionalized Particles as Initiators:

Conditions similar to those used in the ATRP of styrene from highly functional macroinitiators described in referenced applications were used. In this reaction, a conversion of p=0.05 was reached after 51 hrs, 21 min. Approximtely 1000 Br sites were present (determined from elemental analysis), the amount of poly(styrene) incorporated to each particle was approximately $2.6 \times 10^6$ g/mol. From SEC in toluene, against linear polystyrene standards, the hydrodynamic volume of the colloid increased after the ATRP of styrene indicating the nanocomposite particle had been formed. This SEC result was further confirmed by DLS where the hydrodynamic diameter also was found to increase, by approximately 10 nm.

Example 2a

The ATRP of styrene was performed again, using a higher catalyst concentration (2× higher than example 2) to obtain a faster rate. Indeed, this was observed, and the reaction reached a conversion of p=0.09 (gravimetrically determined) in 4 hrs. 19 min. SEC showed that the hydrodynamic radius of the polymer-colloid increased, indicating the grafting reactions were successful. From AFM, the effective diameters of the polymer-colloids increased to 36 nm.

Example 2b

PSty-$SiO_2$ Nanocomposite Particles: Variation of $DP_n$

The synthesis of pSty-$SiO_2$ nanocomposite particles was prepared by the ATRP of Sty from 2-bromoisobutyrate functional colloids. The $DP_n$ of the tethered pSty was systematically varied to ascertain scaling relationships of effective diameter ($D_{eff}$) of the nanocomposite particle in both solution and in the solid-state. The synthesis of lower molecular weight tethered pSty was accomplished as above but for the preparation of a higher pSty nanocomposite particles the following conditions were developed:

General procedure for pSty($M_{n\ tethered}$=30 k) particles:

To a 25 ml Schlenk flask with magnetic stir bar was added silica particles (100 mg, 0.031 mmol), dNbpy (556 mg, 1.364 mmol), Cu(I)Br (88 mg, 0.62 mmol) and Cu(II)$Br_2$ (13.8 mg, 0.027 mmol). The flask was fitted with a rubber septum and evacuated under vacuum (1–5 mm Hg) and back filled with nitrogen (3-cycles). Monomer (Sty, 16.2 g mL, 155 mmol) was bubbled for 30 minutes with nitrogen and added to the flask via syringe. The flask was then placed into an oil bath (100° C.) for 51 hrs, 4 min and sample removed to determine monomer conversion (by $^1$H NMR and gravimetry) Polymers were recovered by precipitation into isopropanol.

JP-12-2 (10% Cu(II))

[M]:[I]:[Cu(I)Br]:[Cu(II)Br$_2$]:[dNbpy], 100 C.

8.75 M: 0.0017 M: 0.034 M: 0.0034 M: 0.076 M, 53 hrs 22 min p(grav)=15%; M$_n$ $_{theo}$=78,000; M$_{nSEC}$=32,670; M$_w$/M$_n$=1.33

41% initiation efficiency based on M$_n$ values

Figure 7:
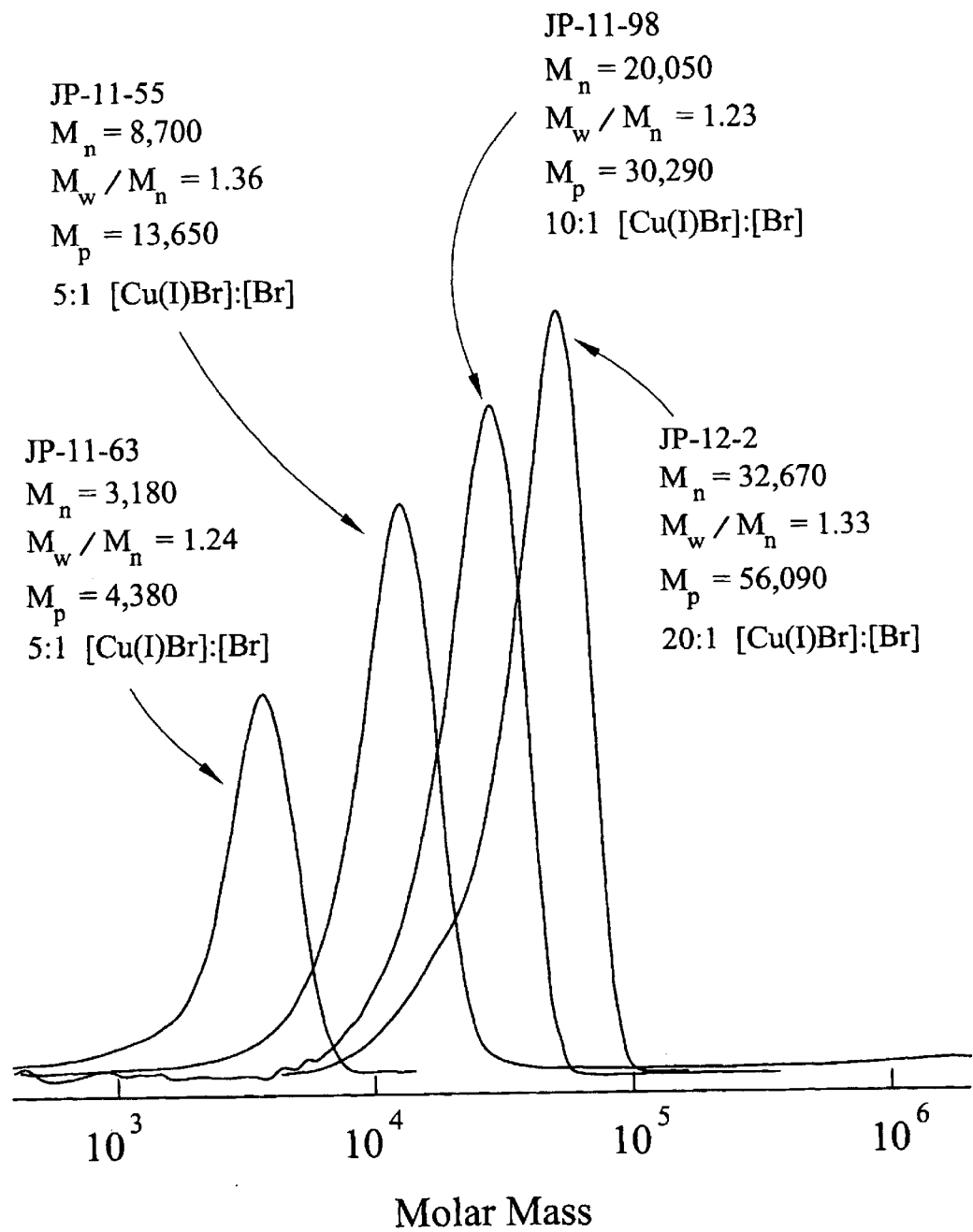
FIG. 7 is a graph produce by SEC of pSty chains cleaved from composite nanoparticles of various sizes produced by the method of the present invention and published data.

SEC of the cleaved pSty from composite nanoparticles of various sizes confirmed that tethered polymers with molar masses ranging from 3,000 to 30,000 could be synthesized using ATRP, FIG. 7.

An inherent problem in targeting high molar mass of tethered polymers is the need for high dilution during the ATRP reaction to avoid interparticle coupling reactions. However, under these conditions the catalyst concentration becomes too low to produce reasonable polymerization rates. To mitigate this problem, a large excess of [Cu(I)] to [Br] was employed in the ATRP of Sty when high DP$_n$'s were targeted.

Figure 8:
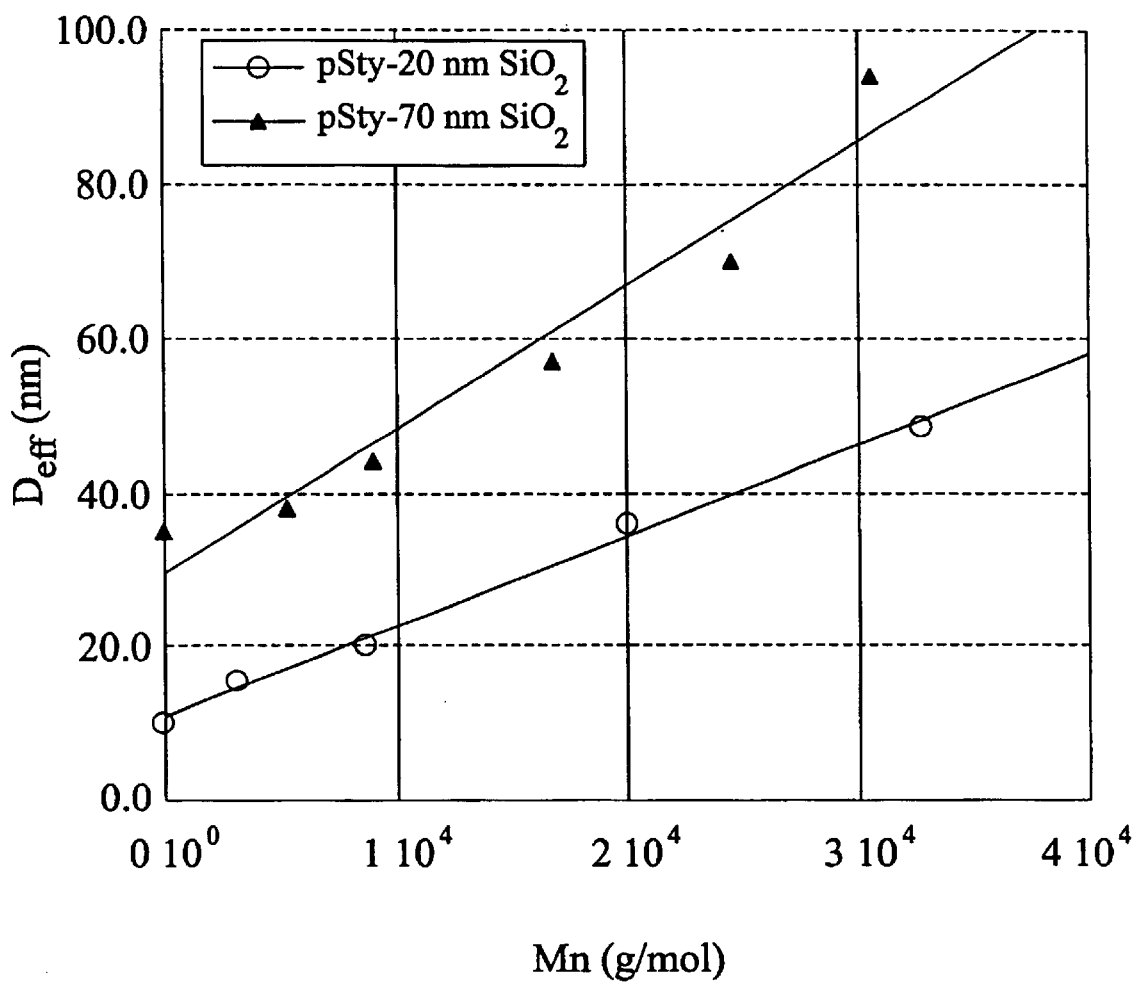
FIG. 8 is a graph of Dynamic Light Scattering data of pSty-SiO$_2$ composite nanoparticles produced by the method of the present invention.

Dynamic light scattering of pSty-SiO$_2$ composite nanoparticles from 20 nm colloidal initiators showed a linear increase of D$_{eff}$ vs. M$_{n\ SEC}$, FIG. 8. Literature values from Patten et al, (*J. Am. Chem. Soc.* 1999, 121, 7409) for composite nanoparticles from 70 nm cooloidal particles were also plotted on FIG. 8 for comparative purposes. The linearity of both plots implies that tethered chains are in an extended, brush-like state, as curvature in the D$_{eff}$ vs. M$_{n\ SEC}$ plot would be expected if tethered chains assume a coiled conformation at higher molar mass. The similarity in the slopes from between D$_{eff}$ vs. M$_{n\ SEC}$ plots from 20 nm and 70 nm silica colloids implied that similar densities of grafted chains per particle were comparable. All D$_{eff\ DLS}$ were determined using the method of cumulants.

Example 3

Figure 9:
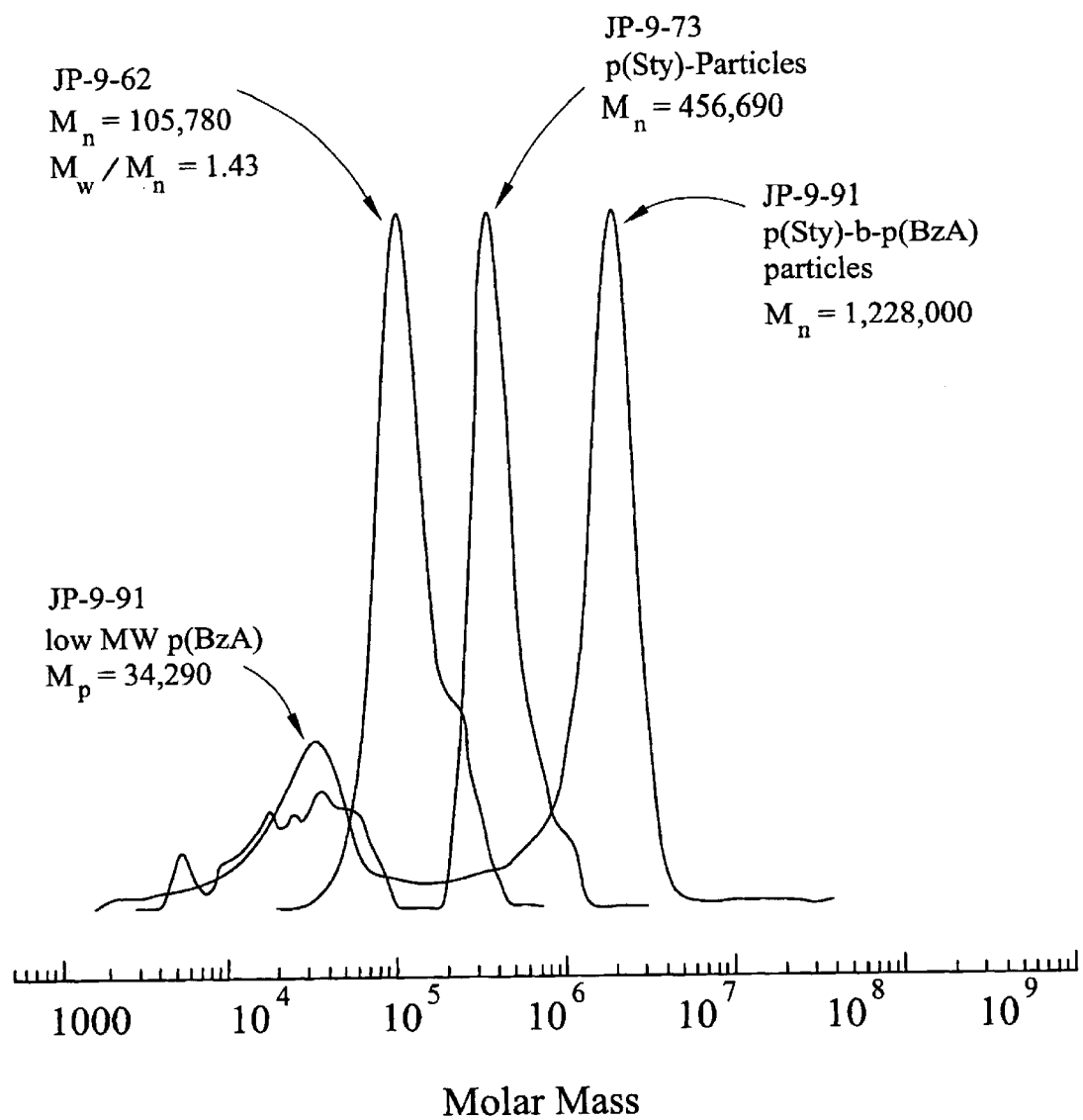
FIG. 9 is a graph of SEC data for various composite nanoparticles with tethered block (co)polymers produced by the method of the present invention.

Tethered-p(Sty)-b-p(BzA) Block Copolymer:

The polystyrene tethered composite nanoparticle was employed as a macroinitiator for polymerization of benzyl acrylate, FIG. 1*a*. A conversion of 10% was observed after 10 hrs. SEC of the product showed that a dramatic increase in the hydrodynamic volume had occurred in the block copolymer synthesis, FIG. 9. AFM of block copolymer particle also confirmed that grafting reactions occurred as seen in FIG. 1*b*, particles pack hexagonally onto a surface and are spaced at a periodicity dependent on the molar mass of the grafted polymers. In the AFM image, particles are observed as black spots 10 regularly spaced in a light matrix of p(BzA) 12. Of particular interest is the presence of dark halos around the particles which may be concentrically oriented p(Sty) segments 11. This infers that the particle induces the block copolymers to phase separate in a concentric fashion around the particle core thereby determining aspects of the bulk morphology of the nanocomposite structures.

Finally, particle chains were cleaved from the core by treatment with hydrofluoric acid (49-vol %) in toluene (1:1 vol of aq. vs organic) using a phase transfer catalyst (Aliquat 336). Three sets of particles were cleaved, and as seen in the SEC chromatograms, FIG. 9, the polymers displayed monomodal MW distributions. The first polymerized polystyrene chains obtained were of low molar mass and polydispersity (M$_n$=9850; M$_w$/M$_n$=1.2). Conversely, the p(Sty)-b-p(BzA) copolymer possessed both a low molar mass tail and a high MW shoulder (M$_n$=27,280 M$_w$/M$_n$=1.48). For both systems, polymers possessed molar mass, approximately twice the values that would be estimated from conversion values. $^1$H NMR of the p(Sty)-b-p(BzA) copolymer obtained after HF treatment indicated that HF did not decompose the copolymer. Based on NMR estimates the compositions the copolymer was 89%-mol p(BzA) and 9-mol % p(Sty). Since, the molar mass of the polystyrene segment was M$_n$=5,250, the M$_{n\ NMR}$ of the block copolymer was calculated to be M$_n$=47,724 g/mol.

3a. Calculations of the Number of Tethered Polystyrene Chains and the Number of Tethered Polystyrene-b-polybenzyl Acrylate Chains per Nanoparticle from AFM Data The increase of diameters of the nanocomposite particles was measured and calculated from AMF data on the surface area of the ultra-thin films. From these values, a effective diameter and radius were calculated for the bare particles and tethered-pSty particles, tethered-p(Sty)-b-p(BzA) particles. Since the volume of the bare particles was known, the volume of the tethered polymer particle could be obtained. By assuming the (co)polymer density (ρ=1), the total mass of (co)polymer per particle was calculated. From HF cleavage experiments, the apparent molar mass of the tethered chains was obtained. In the case of the t-p(Sty)-b-p(BzA), the increased polydispersity of the block copolymer complicated the exact measurement of the mass/polymer chain. Thus, three values were used to calculate the number of grafted polymers, namely, the M$_{n\ SEC}$ which included a low molar mass tail, M$_{n\ main\ peak}$, and the M$_{n\ NMR}$.

Calculations of the nanocomposite particle volumes was conducted using both spherical and cylindrical models to account for any surface induced effects on the geometry. The results from these calculations are presented in Tables 2 and 3.

TABLE 2

Volumes/Grafting # of Grafted Chains Of Composite Particles Assuming Spherical Volume = 4/3(3.14) (r$^3$), AFM Diameters

| Particle | Volume | Mass g/molecule | # of Chains Total Mass$_{polymer}$/ mass of tethered polymer |
|---|---|---|---|
| Bare Particle | r = 12 nm<br>V = 7.23 × 10$^{-18}$ cc | | |
| p(Sty)-Particle | r = 15 nm<br>V = 1.41 × 10$^{-17}$ cc<br>V$_{polymer}$ = 6.87 × 10$^{-18}$ cc | M$_n$ = 5250<br>8.71 × 10$^{-21}$ g/molec | 788 |
| p(Sty)-b-p(BzA) | r = 27.5 nm<br>V = 8.71 × 10$^{-17}$ cc | M$_n$ = 27,280<br>4.53 × 10$^{-20}$ g/molec<br>M$_{n\ main\ peak}$ = 34,810 g/molec<br>5.78 × 10$^{-20}$ g/molec | 1763<br>1381 |

TABLE 2-continued

Volumes/Grafting # of Grafted Chains Of Composite Particles Assuming Spherical Volume = 4/3(3.14) (r³), AFM Diameters

| Particle | Volume | Mass g/molecule | # of Chains Total Mass$_{polymer}$/mass of tethered polymer |
|---|---|---|---|
| | $V_{polymer}$ = 7.987 × 10$^{-17}$ cc | $M_{n\ NMR}$ = 47,724 7.925 × 10$^{-20}$ g/mol | 1007 |

TABLE 3

Volume/Grafting # Assuming Cylindrical Volume = H × (3.14)r², AFM Diameters

| Particle | Volume | Mass g/molecule | # of Chains |
|---|---|---|---|
| Bare Particle | r = 12 nm<br>V = 7.2 × 10³ nm³ =<br>7.2 × 10$^{-18}$ cc | | |
| p(Sty)-Particle | r = 15 nm,<br>H = 18<br>V = 12.7 × 10³ nm³ =<br>1.27 × 10$^{-17}$ cc<br>$V_{polymer}$ = 5.5 × 10³ nm³ =<br>5.5 × 10$^{-18}$ cc | $M_n$ = 5250<br>8.71 × 10$^{-21}$ g/molec | 632 |
| p(Sty)-b-p(BzA) | r = 27.5 nm,<br>H = 20<br>V = 47.5 × 10³ nm³<br>= 47.5 × 10$^{-17}$ cc<br>$V_{polymer}$ = 4.03 × 10$^{-17}$ cc | $M_n$ = 27,280<br>4.53 × 10$^{-20}$ g/molec<br>$M_{n\ main\ peak}$ = 34,810<br>5.78 × 10$^{-20}$ g/molec<br>$M_{n\ NMR}$ = 47,724<br>7.925 × 10$^{-20}$ g/mol | 889<br><br>697<br><br>508 |

Example 4
ATRP of t-butyl Acrylate from Nanoparticles

Functional nanoparticles were prepared via a microemulsion approach, the synthesis is reviewed in FIG. 2. Using this approach, ~400 mg of particles were recovered, possessing approximately 1000 Br sites/particle, assuming a $M_w$~2×10⁶. These particles were found to have diameters from 15–20 nm, with low polydispersities, as determined by DLS. The ATRP of t-BA from 2-bromoisobutyryl functional silicate nanoparticles was conducted, yielding nanocomposite particles and untethered homopolymer. This would indicate the presence of untethered initiating species. The presence of untethered initiator can be attributed to the physiadsorption of bromoisobutyryl silanes onto particle surfaces without covalent linkages between them. The residual functional silanes was removed by conducting dialysis in acetone, using regenerated cellulose (RC) membranes.

Figure 10A:
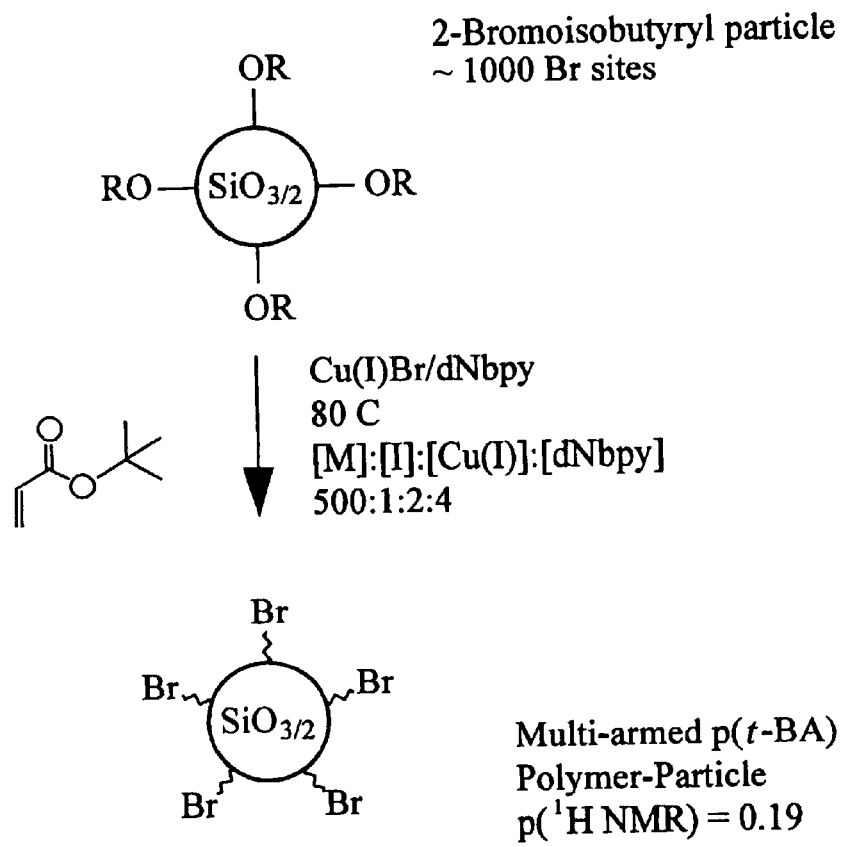
FIG. 10a is a representation of a scheme for ATRP of t-BA on 2-bromoisubutyrl particles.
Figure 10B:
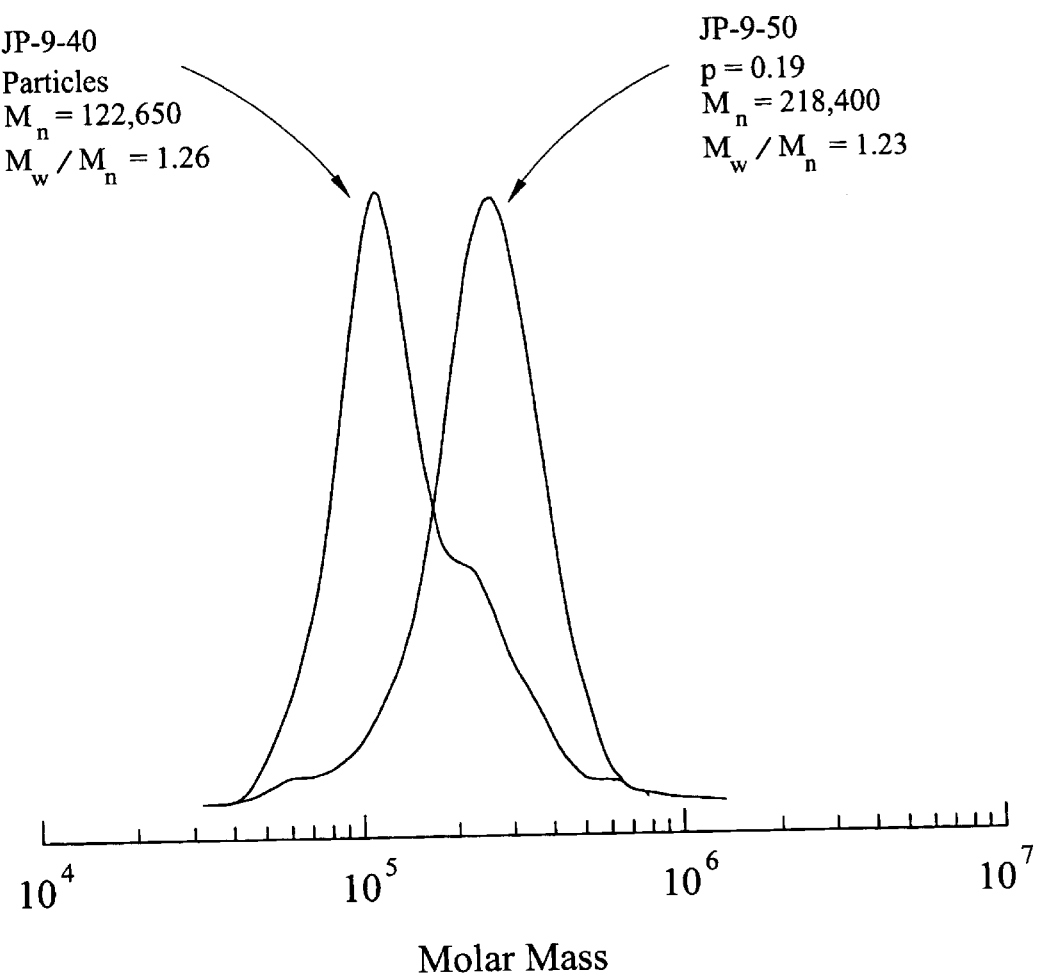

4a. The synthetic scheme, shown in FIG. 10a, for the ATRP reaction from particle surfaces employed the following conditions (500:1:2:4, [M]:[I]:[Cu(I)Br]:[dNbpy], at 85° C.). After a 5 day reaction period, a monomer conversion of 19% had been obtained, as well as an increase in molar mass of the functionalized silica nanoparticle to poly-tethered-butyl acrylate grafted composite nanoparticle. The SEC chromatogram, FIG. 10b, of the ensuing product showed that the molar mass of the composite particle had increased and the $M_w/M_n$ ratio was narrow, 1.23. Polymerizations were kept to low monomer conversions to avoid interparticle gelation reactions. The absence of low molar mass species indicated that purification of the functional colloids by dialysis was successful.

TEM of Composite Nanoparticles

TEM measurements of particles sizes for 2-bromoisobutyrate functional SiO$_{1.5}$ colloids (JP-9-62), pSty ($M_n$=5,230) composite nanoparticles (JP-9-73), pSty ($M_n$=9,850) composite nanoparticles (JP-9-89) and p(Sty-b-BzA) composite nanoparticles (JP-9-91) were conducted.

TEM Analysis of Particle Sizes.

Figure 11:
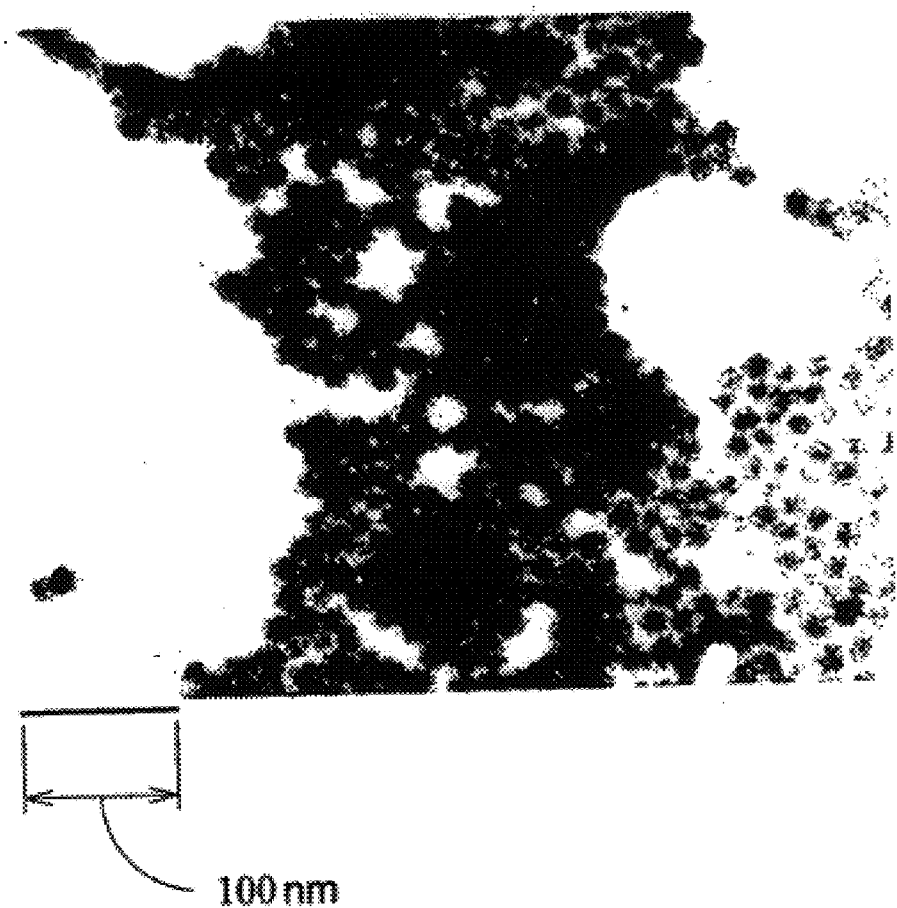
FIG. 11 is a TEM image of polysilsesquioxane colloidal initiators used in the polymerization process of the present invention.
Figure 12:
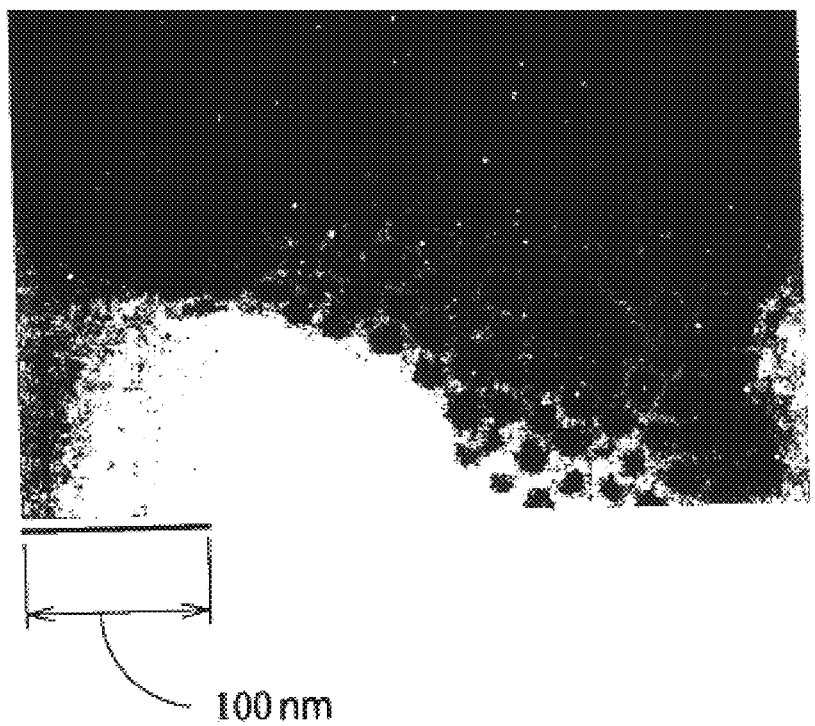
FIG. 12 is a TEM image of polystyrene nanocomposite particles having a tethered block copolymer chain having a number average molecular weight of approximately 5,230.
Figure 13:
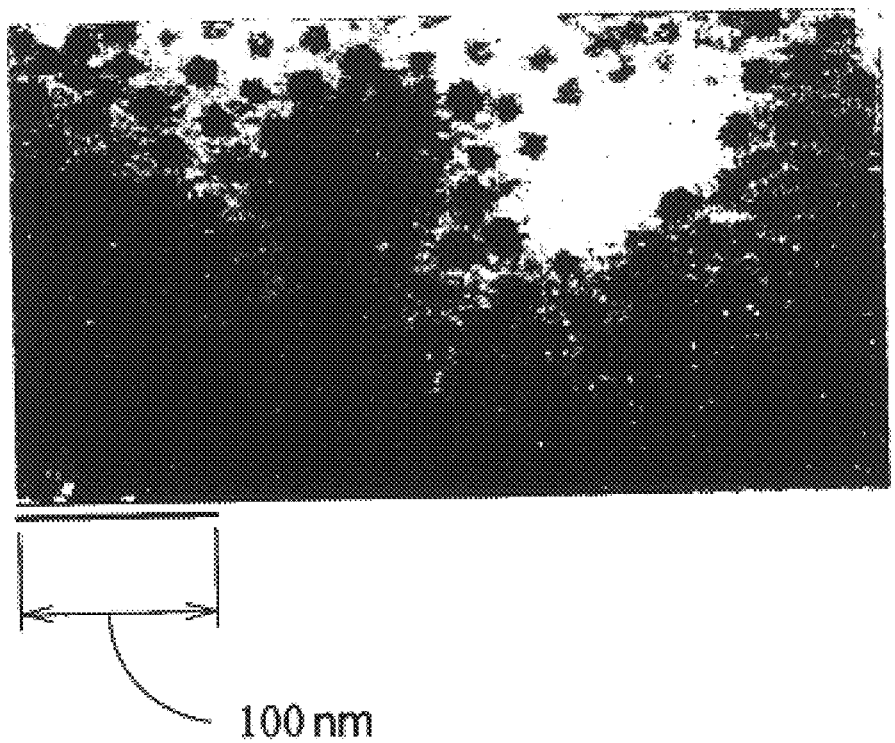
FIG. 13 is a TEM image of nanocomposite particles with a tethered polystyrene chain having a number average molecular weight of approximately 9,850.
Figure 14:
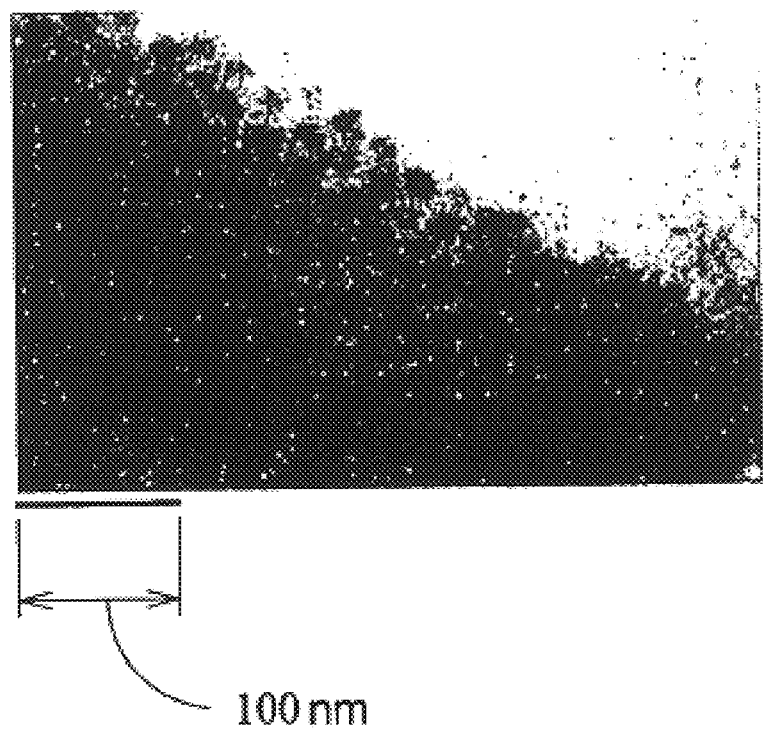
FIG. 14 is a TEM image of p(Sty-b-BzA) composite nanoparticles having a tethered block copolymer chain having a number average molecular weight of approximately 27,280.
Figure 15:
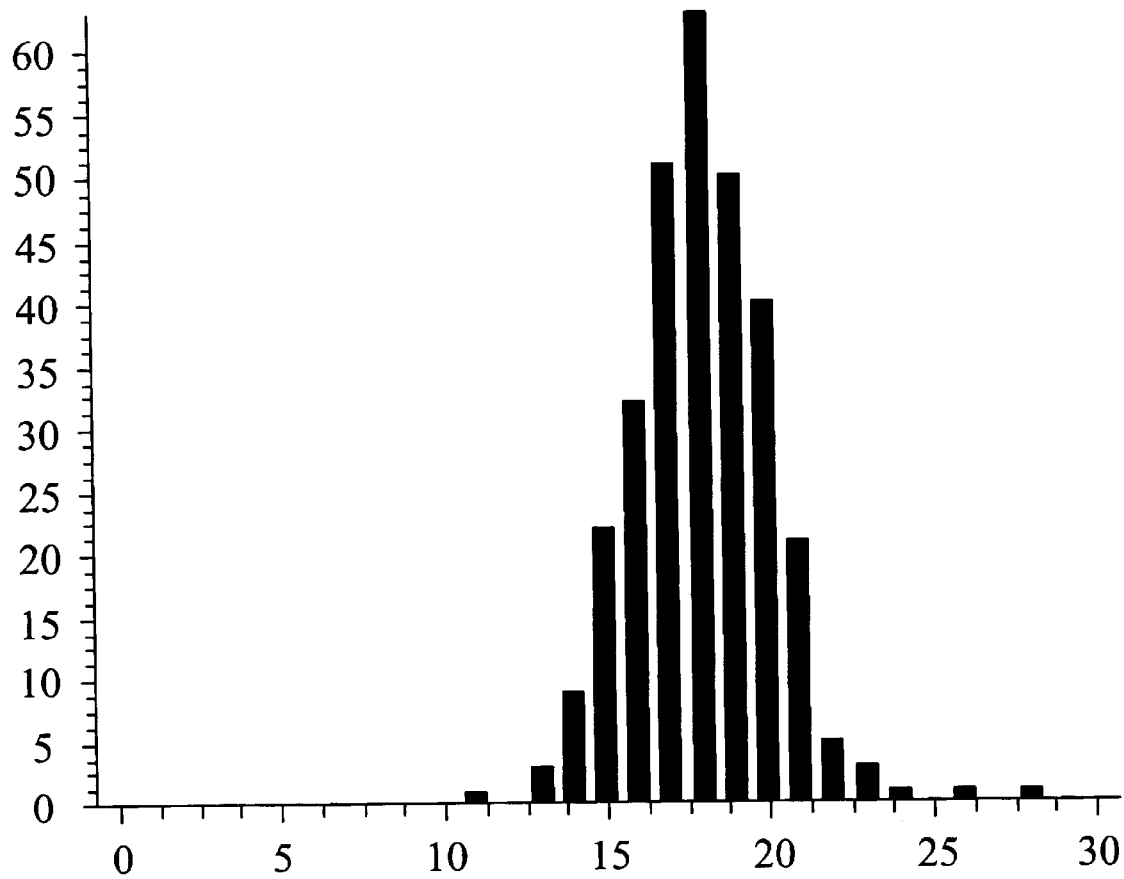
FIG. 15 is a graph of the particle size distribution of polysilsesquioxane colloidal initiators analyzed from TEM images.

TEM of bare polysilsesquioxane particles, FIG. 11, pSty ($M_{n\ tethered}$=5,230) tethered composite nanoparticles, shown in FIG. 12, pSty ($M_{n\ tethered}$=9,850) tethered composite nanoparticles, shown in FIG. 13 and p(Sty-b-BzA) particles, shown in FIG. 14, was conducted. The effective diameters and size distributions of the colloidal initiators and composite nanoparticles were ascertained by first scanning and importing TEM images of nanoparticles into Adobe Photoshop (6.0). Polysilsesquioxane colloidal cores were then traced from TEM images of bare particles, pSty ($M_{n\ tethered}$=5,230) particles, pSty ($M_{n\ tethered}$=9,850) particles and p(Sty-b-BzA) particles using the elliptical marquee. The ellipsoids were filled and then imported into the Imagetool software where pixel counting of thresholded images and assignment of center of masses were performed. Analysis of $D_{eff}$ values for polysilsesquioxane, pSty and p(Sty-b-BzA) nanoparticles in ultrathin films required the writing of custom made software. For bare polysilsesquioxane particles, particle sizes were determined by converting pixels into the appropriate dimensions for the thresholded images of traced nanoparticle ellipsoids. Alternatively, nearest neighbor distance analysis for colloidal cores dispersed within ultrathin films of polysilsesquioxane, psty and p(Sty-b-BzA) nanoparticles was performed. For submonolayer patches where bare polysilsesquioxane particles were in contact, nearest neighbor analysis yielded the $D_{eff}$ of colloids in the ultrathin film. Additionally, for pSty and p(Sty-b-BzA) nanoparticle ultrathin films, the spacing between the center of masses of polysilsesquioxane cores within the tethered polymer matrix enabled determination of $D_{eff}$ values.

Comparison of TEM vs. AFM Analysis of Particle Sizes

It is important to note the AFM analysis of particle sizes did not provide information about the distribution of $D_{eff}$ values since nanoparticle sub-monolayer patches were analyzed, as opposed to individual particles. Error associated with the $D_{eff}$ measurement indicated the level of accuracy in the analysis, with deviation arising from nonplanarity in the surface of the submonolayer patches, and thresholding set points of nanoparticles located on the edges of ultrathin films. On the other hand, TEM analysis of particle sizes provided both $D_{eff}$ and distributions of sizes. Despite the difference in the measurement approaches, effective diameters of bare polysilsesquioxane particles ascertained from TEM images ($D_{eff\ TEM}$=18 nm±2 nm, FIG.

15, $D_{\text{eff TEM nearest neighbor}}$=21 nm±2 nm) were in reasonable agreement with AFM measurements ($D_{\text{eff AFM}}$=19 nm±1 nm). The smaller error of the $D_{\text{eff AFM}}$ value (±1 nm) relative to the standard deviation of $D_{\text{eff TEM}}$ (±2 nm) further supported the accuracy and precision of AFM to ascertain particle sizes of bare polysilsesquioxane colloids and composite nanoparticles. Good agreement between TEM and AFM effective diameters for lower and higher molar mass psty nanoparticles was also observed, see Table 4. However, for p(Sty-b-BzA) nanoparticles, a significant discrepancy between $D_{\text{eff AFM}}$ and $D_{\text{eff TEM}}$ was obtained, see Table 4. This lack of agreement was attributed to different spreading behavior of tethered p(Sty-b-BzA) on the TEM carbon coated copper grid versus the AFM mica substrate. Thus, AFM was particularly needed to analyze particle sizes of p(Sty-b-BzA) nanoparticle films as the volume of the ultrathin film was also obtained to confirm the grafting of a pBzA segment onto the pSty nanocomposite particle.

TABLE 4

Comparison of AFM vs. TEM$_{\text{nearest neighbor}}$ Particle Sizes of Polysilsesquioxane

|  | $D_{\text{eff}}$ (AFM) (nm) | $D_{\text{eff Nearest Neighbor}}$ (TEM) (nm) |
|---|---|---|
| Polysilsesquioxane Colloidal Initiators | 19.0 ± 1.0 | 21 ± 2.0 |
| pSty Hybrid Nanoparticles $M_{n\text{ tethered}}$ = 5,230 | 27.0 ± 1.5 | 27.0 ± 2.0 |
| pSty Hybrid Nanoparticles $M_{n\text{ tethered}}$ = 9,850 | 31.0 ± 1.5 | 31.0 ± 2.0 |
| pSty-b-pBzA Hybrid Nanoparticles $M_{n\text{ tethered}}$ = 27,280 | 56.0 ± 3.0 | 29.0 ± 2.0 |

Colloidal Initiators, pSty and p(Sty-b-BzA) Nanocomposite particles

Example 5

Polybenzyl Acrylate Nanocomposite Particle.

The synthesis of nanocomposite particles with poly (benzyl acrylate) (p(BzA)) tethered to the particle was conducted for analysis by AFM. As reported above, the block copolymer composite particles of p(Sty)-b-p(BzA) exhibited halo containing morphologies as seen by AFM. To ascertain whether the halo morphology was real, AFM analysis of both a tethered polystyrene-particle and a tethered polybenzyl acrylate-particle was conducted.

The ATRP of benzyl acrylate was conducted at high dilution in bulk from 2-bromoisobutyrate functional particles, such as those prepared in Example 2, as multifunctional initiators. Particles used in this reaction were from the same sample to those used to prepare the p(Sty)-b-p(BzA) tethered composite particle, except these particular colloidal initiators were collected from the 2$^{nd}$ fraction of the fractionation step used to purify the 2-bromoisobutyrate functionalized particles. Thus, the amount of free-untethered initiator groups was higher than in particles recovered from the 1$^{st}$ fraction of the fractionation process used in Example 2.

The conditions for the ATRP of BzA from the particle surface can be summarized as being done in bulk benzyl acrylate with a ratio 762:1 of monomer to initiator. The initiator stoichiometry is calculated by analyzing for the moles of bromine per particle. The ratio of Cu(I) to Br was 7:1, with 5-mol % Cu(II) relative to Cu(I). Actual molar ratio's are:

6.1 M: 0.008M: 0.062M:0.002 M: 0.129 M,

[M]:[Br]:[Cu(I)]:[Cu(II)]:[dNbpy], reaction temperature 80 C.

BzA (34 mmol), Particles (134 mg, 0.048 mmol); Cu(I)Br (48 mg, 0.34 mmol), Cu(II)Br2 (3 mg, 0.013 mmol) dNbpy (290 mg, 0.7 mmol), p=0.15. Mn=425,320; Mw/Mn=1.40; Mn=12,840, Mw/Mn=1.49 ($M_n$ values are apparent Molar Masses against polystyrene standards.)

SEC indicated that the grafting of p(BzA) was successful at monomer conversions of 15%. However, the presence of a low molar mass peak indicated that a significant amount of untethered p(BzA) had been present. The amount of the lower molar mass polymer was significantly larger than previously observed. This was attributed to the presence of untethered initiator groups that were used in the functionalization of colloids and were not sufficiently removed from the particles by precipitation.

Figure 3:
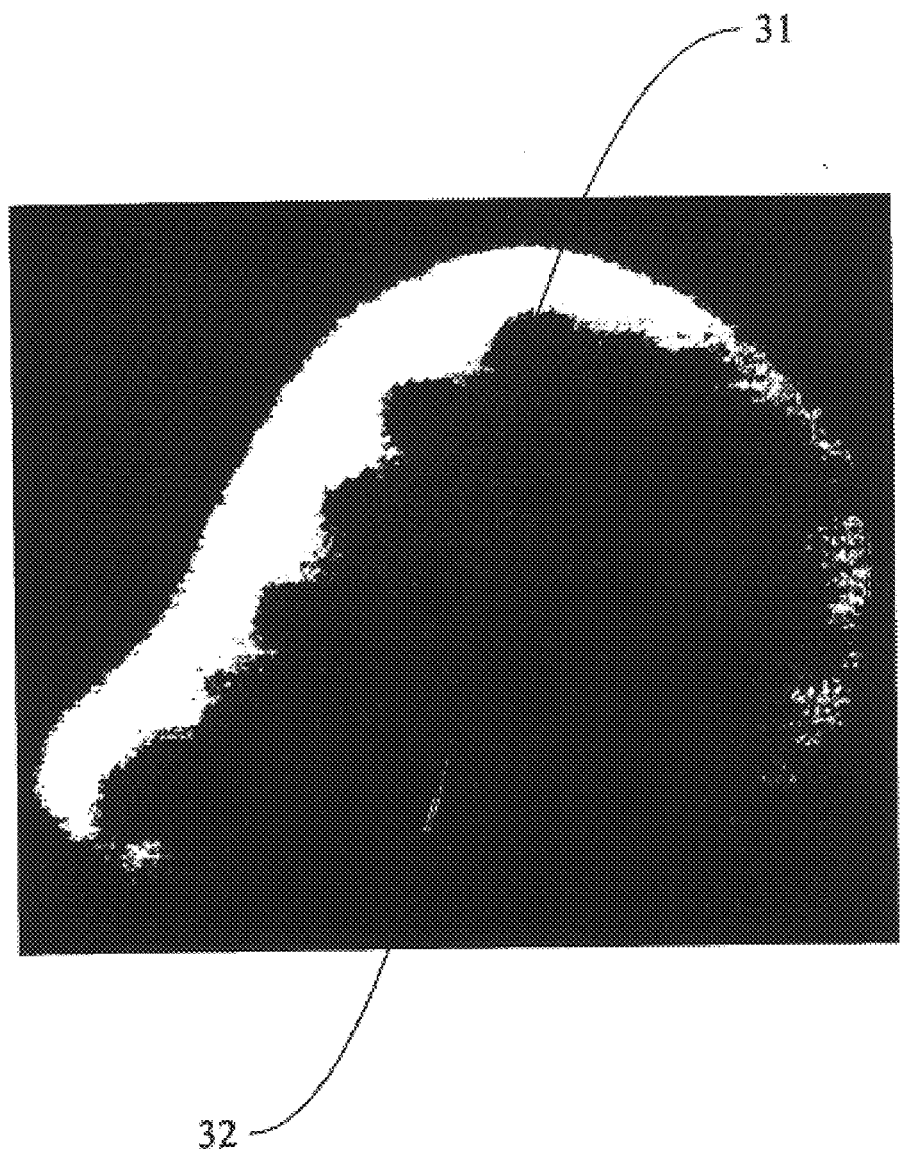
FIG. 3 is an AFM phase image of a p(Benzyl Acrylate)-particle submonolayer on mica.

The AMF image of the tethered polybenzyl acrylate particle on mica is shown in FIG. 3. The dark spots in the image 31 correspond to the nanoparticle and the light area 32 corresponds to a continuous phase of polybenzyl acrylate. The halo attributed to the tethered polystyrene block, seen in AFM image of the tethered copolymer in FIG. 1b, is not seen in the tethered homopolymer of FIG. 3.

Figure 16:
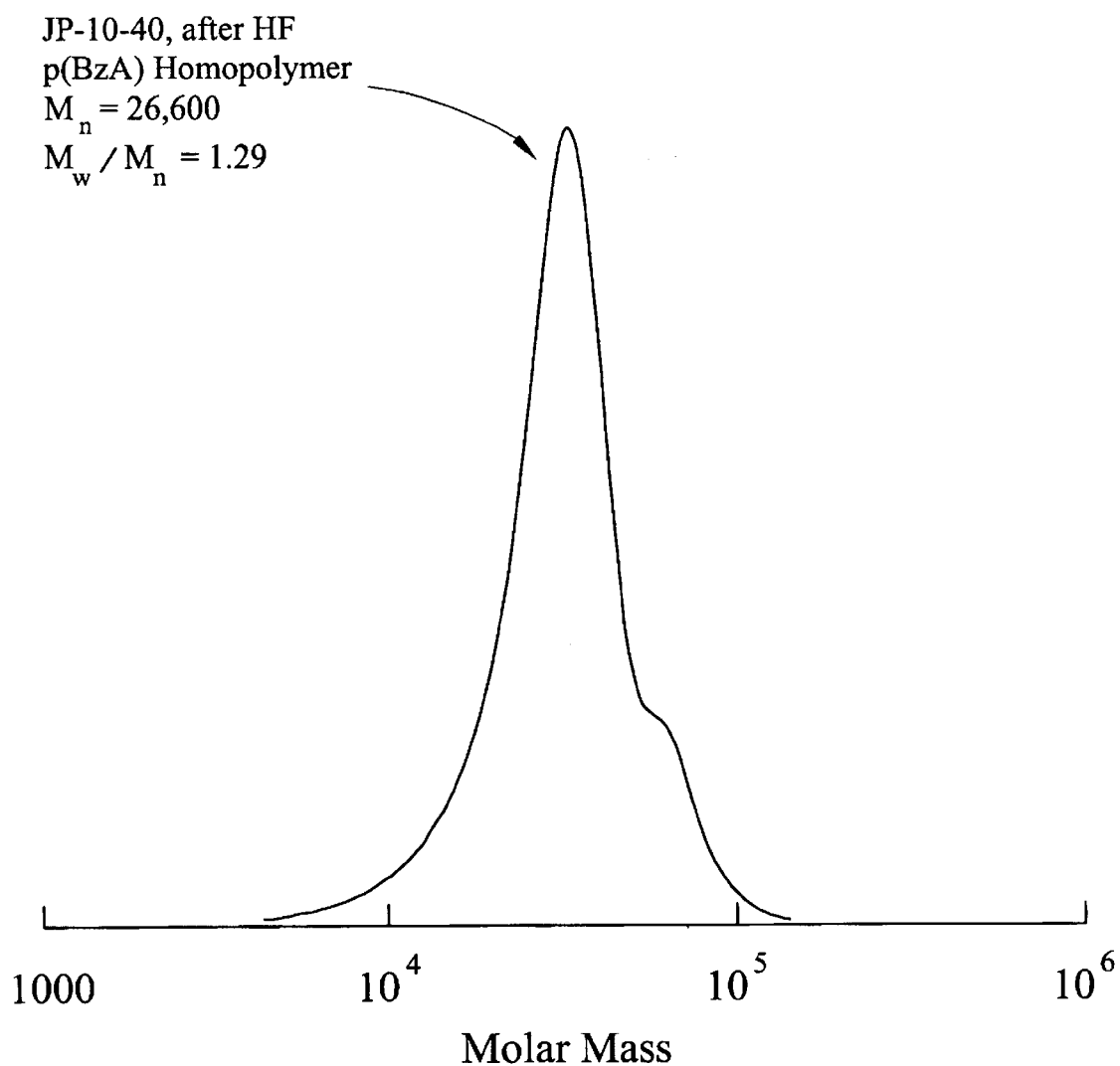
FIG. 16 is a graph of SEC data of p(BzA) homopolymer after cleavage from the nanocomposite nanoparticle produced by the method of the present invention.

The molar mass determination of p(BzA) tethered to nanoparticles was conducted by HF particle core destruction using the following procedure. 100 mg of the p(BzA) tethered composite nanoparticle was dissolved in 1 mL of toluene, with 7.8 mg of Aliquate 336 (phase transfer catalyst). A 49%-HF (aq.) solution (1 mL) was added to the particle solution and the reaction was allowed to stir at room temperature for 1 week. Usually, the reaction is stopped after 24 hrs, however, in this case solvent was allowed to evaporate and the polymer was recovered as a viscous liquid after decanting of HF (aq). SEC of the p(BzA) homopolymer, FIG. 16, indicated that some coupling reactions had occurred during the polymerization, as evidenced by a high molecular weight shoulder ($M_n$=26,600; $M_w/M_n$=1.29).

Example 6

ATRP of n-butyl Acrylate from 2-bromoisobutyrate Functional Particles: Synthesis and Characterization of Tethered Poly(n-butyl acrylate) Particles.

Composite nanoparticles comprising poly(n-butyl acrylate), (pBA), were prepared using ATRP. These tethered-(pBA) particles were prepared to function as initiators in a second ATRP for preparing block copolymer composite nanoparticles particles with a very soft interior (pBA) and hard peripheral (pSty) segments. In the ATRP of n-butyl acrylate from colloidal initiators, polymerization was conducted at high dilution (in bulk) in the presence of both Cu(I) and Cu(II). Polymerizations were also kept at low monomer conversion (p=0.135) to avoid gelation of particles by coupling reactions. Conditions for the ATRP of n-butyl acrylate from 2-bromoisobutyrate functional particles were the following: [M]:[I]:[Cu(I)Br]:[Cu(II)Br$_2$]:[dNbpy] 6.96 M: 0.0098 M: 0.034 M: 0.001 M: 0.07 M, at 90 C., reaction time 7 hr 7 min.

SEC of the resulting product reveealed an increase in the hydrodynamic volume of the colloidal initiators after the ATRP of n-butyl acrylate. Based on conversion estimations, polymers of $M_n$=12,240 would be obtained at a conversion of 13.5%; assuming that an average of 1000 Br sites were available for initiation on each particle. A composite nanoparticle of $M_n$~1×10$^7$ g/mol would be obtained. It also worth noting that a small amount of untethered p(BA) was also formed at low molar masses. Core destruction by HF yielded p(BA) polymers with $M_{n\ SEC}$=14,630, $M_w/M_n$=1.33, as determined in toluene, against p(Sty) standards. The relatively close agreement of $M_{n\ SEC}$ with $M_{n\ theoretical}$ of the cleaved p(BA) implied that a high initiation efficiency from the collodial initiator was achieved. Verification of the high initiation efficiency can be obtained from light scattering measurements of $M_w$.

Example 7

Synthesis of t-p(n-BA)-b-p(Sty) Particles

The synthesis of t-p(BA)-b-p(Sty) nanocomposite particles was then conducted by the chain extension of styrene from p(BA) composite nanoparticles prepared in Example 6. These block copolymers were prepared to investigate the morphology and properties of colloidal systems with a soft interior and hard peripheral segments. It was expected that the soft p(BA) phase would impart interesting thermoplastic elastomeric properties if the peripheral segments were physically crosslinked domains of p(Sty).

The following conditions were used: [M]:[I]:[Cu(I)Br]: [Cu(II)Br$_2$]: [dNbpy] 8.76 M: 0.011 M: 0.087 M: 0.004 M: 0.17 M, at 90 C., reaction time 2 hr 9 min. These conditions were similar to those used in the ATRP of styrene from silicone wafers. However, the polymerization reached an 18% monomer conversion ($^1$H NMR) in 2 hr. 9 min., indicating that too many radicals were generated from the ratio of copper(I)/copper(II) used in the system. The block copolymer particle was precipitated into isopropyl alcohol, (IPA), and washed repeated with IPA until a white, flaky powder was recovered (314 mg).

Analysis of the t-p(BA)-b-p(Sty) composite particles was conducted by SEC, and AFM. The block copolymers were redispersable in chloroform, toluene and THF, but the solution would not pass through a 0.2 micron PTFE filter. Thus, SEC analysis of the block copolymers was not conducted. However, cleavage of block copolymer chains from the particle by HF treatment enabled analysis of the attached p(BA)-b-p(Sty) copolymer by SEC and $^1$H NMR. Composition of the p(BA)-b-p(Sty) copolymer recovered after HF cleavage by $^1$H NMR indicated that 80-mol % of p(Sty) was present. This high mole fraction would be expected to provide a polystyrene matrix rather than dispersed polystyrene domains.

AFM images of the block copolymer particles in both height and phase modes confirmed the growth of block copolymers from the particle. In particular, in AFM phase images, the presence of dark halos (pBA) around light cores (particles) in a light continuous phase (pSty) was observed. AFM height and phase images of the p(BA)-b-p(Sty) particle show that a uniform spacing of particles was achieved, FIG. 4a and FIG. 4b. Compressibility of the particle monolayer by the AFM cantilever was not significant due to the high content of glassy p(Sty) in the matrix of the ultrathin film.

Example 8

Synthesis of Bithiophene Functional Particles

The synthesis of bithiophene functional particle was conducted with the expectation of using the functional particle in the preparation of poly(thiophene)/particle hybrids. Bithiophene groups were first attached to the particle surfaces by the reaction of a bithiophene-chlorosilane with silicate particles treated with a monoalkoxysilane (see Step 2, FIG. 2), and resuspended in THF.

One of the advantages of using the bithiophene-chlorosilane was the ability to confirm the incorporation of bithiophene groups to the particle by online UV detection in SEC measurements. This could not as easily be done for 2-bromoisobutyryl-chlorosilanes due to the absence of UV-absorbing chromophores on the functionalized particle. Polymerization from the functional particles was successful.

Example 9

Synthesis and Functionalization of p(Sty) Particles with Azide End-groups

Poly(styrene) nanocomposite particles possessing azide end-groups were targeted to prepare reactive nanofillers capable of reacting with unsaturated elastomers/rubbers. Poly(styrene) nanocomposite particles bearing bromine end-groups were synthesized by the ATRP of styrene from 2-bromoisobutyrate polysilsesquioxane colloids (JP-11-31). SiO$_{1.5}$ colloidal initiators (JP-10-74) used in the ATRP of styrene were purified by four passes through ultrafiltration RC membranes. The ATRP conditions used were the following:

[M]:[Br]:[Cu(I)Br]:[Cu(II)Br$_2$]:[dNbpy]=8.7 M: 0.008 M: 0.04 M: 0.002 M: 0.08 M, 90° C.

reaction time=8 hrs., 57 min, p($^1$H NMR)=6.7%

SEC of the product after polymerization indicated a trimodal distribution. The high molar mass peak indicated that ATRP of styrene from the particle had resulted. However, the presence of low molar mass polymers below $M_n$<100,000 g/mol indicated that grafting to the particle did not exclusively occur. The presence of polymer at $M_n$~100,000 g/mol had not been observed previously, and is currently assigned to SiO$_{1.5}$ colloids that were not functionalized with ATRP initiating groups.

End-group transformation of bromine with azides was conducted with the crude product of the ATRP styrene polymerization described above (JP-11-31). Conditions used in the reaction were taken from previously published work with low molar mass azide functional p(Sty). The azide functionalization reaction was done using the following conditions:

p(Sty) particles (200 mg, 0.08 mmol), trimethylsilylazide (15 μL, 0.12 mmol), tetrabutylammonium fluoride (TBAF) (1.0 M THF; 0.12 mL, 0.12 mmol) in 0.8 mL of reagent grade THF.

After addition of TBAF, a red-brown solution was formed. The reaction was allowed to proceed for 24 hrs at room temperature, and precipitated into 10 mL of MeOH. Elemental analysis of the materials before and after azide treatment revealed that nitrogen content increased after azide treatment of particles. However, the elemental analysis of Br at low compositions was not possible, complicating quantification of azide formation.

| Elemental Analysis p(Sty)-Br Particles | Elemental of p(Sty)-N$_3$ |
|---|---|
| C: 75.9% | C: 79.24 |
| H: 7.12% | H: 7.27 |
| Br: undetectable | Br: undetectable |
| N: 0.13% | N: 0.45% |

Example 10

Figure 17:
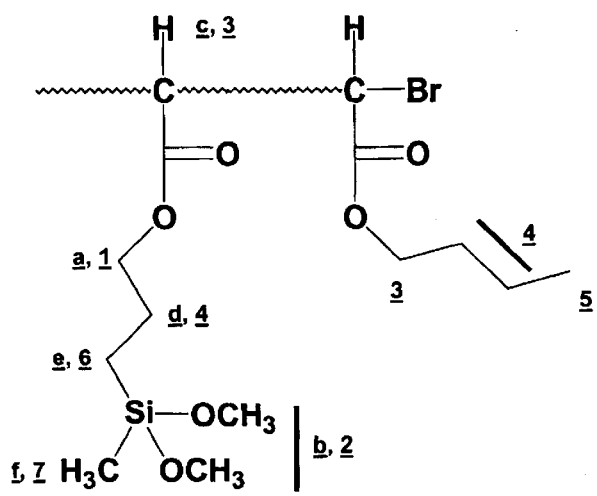
FIG. 17 is a graph of $^1$H NMR data of pDMSA homopolymer and p(DMSA-b-BA) copolymers cleaved from composite particles produced from the method of the present invention.
Figure 17:
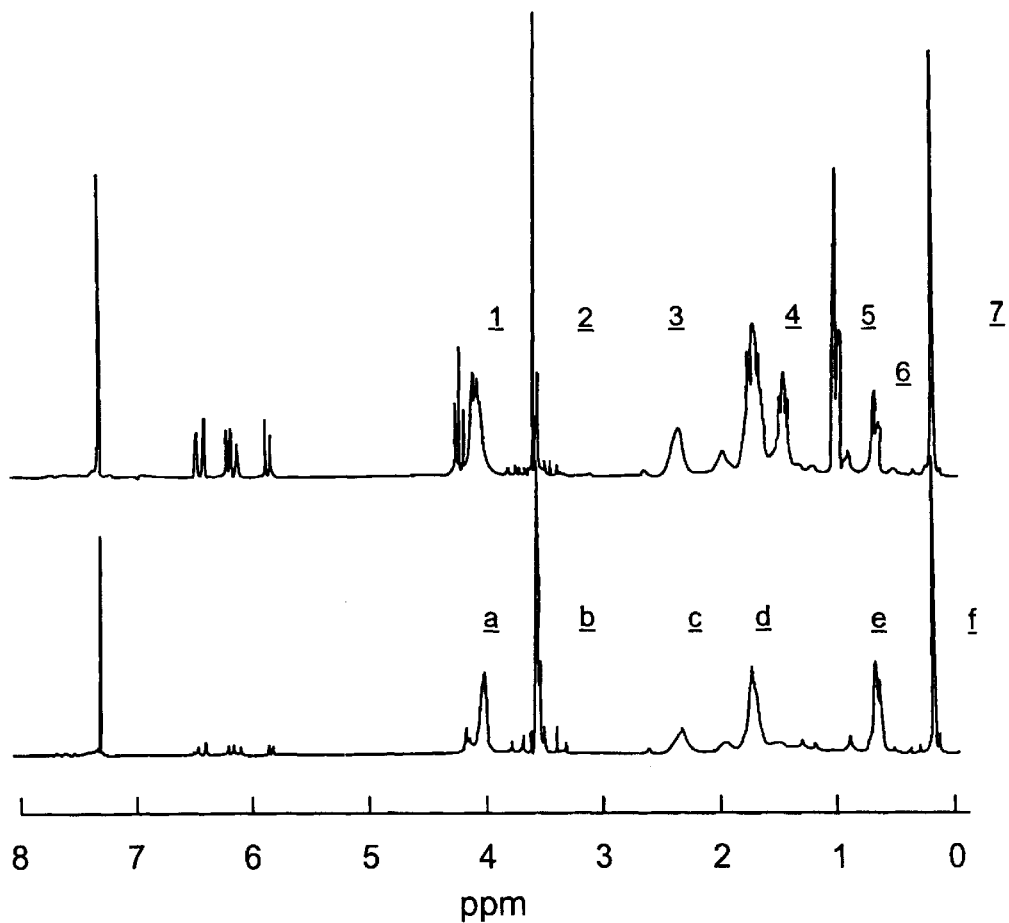

ATRP of 3-(dimethoxymethylsilyl)propyl Acrylate: Homopolymers and Gradient Copolymers An ATRP reaction with dialkoxysilane acrylate (DMSA) was successful using standard conditions for the homogeneous ATRP of acrylates. The synthesis of reactive block copolymers was conducted using a pnBA macroinitiator in the ATRP of 3-(dimethoxymethylsilyl)propyl acryate. Initially, a gradient copolymer of p(BA-b-DMSA) was prepared with a very high content of pDMSA relative to pBA, by sequential addition of nBA after high conversions in a DMSA ATRP experiment. The opposite approach was taken to insure that a well-defined pBA segment ($M_n\sim25$ k) of predetermined molar masses and functionality were used. The targeted material for this Example was a block copolymer with a very small content of pDMSA, which upon phase separation and crosslinking within pDMSA domains would yield hairy microgels with pBA tethered chains. Conditions used in the synthesis were as follows:

10a. General procedure for the ATRP of DMSA: To a 5 ml round bottom flask with magnetic stir bar was added Cu(I)Br (9.7 mg, 0.068 mmol), dNbpy (55.4 mg, 0.136 mmol mmol). The flask was fitted with a rubber septum, evacuated under vacuum (1–5 mm Hg) and backfilled with $N_2$. This cycle was repeated three times. 3-(dimethoxymethylsilyl)propyl acrylate (1.5 mL, 6.8 mmol) was bubbled with nitrogen for 30 minutes and then added to the Schlenk flask via syringe followed by ethyl 2-bromoisobutyrate (9.8 µL, 0.068 mmol). The flask and was then placed into an oil bath (90° C.) and samples were removed periodically via syringe for determination of conversions (by $^1$H NMR). Within 4 hrs, 57 min, a high monomer conversion (p=0.95) was achieved. In the synthesis of gradient copolymers of p(DMSA-b-BA, n-butyl acrylate (bubbled with $N_2$ for 30 minutes) was then added directly to the reaction mixture via syringe. After an additional 17 hrs and 25 min., the red-brown reaction mixture was viscous and stirring ceased, indictive of high conversion of n-butyl acrylate (p=0.72). The copolymer was then precipitated into hexane. A clear phase separated at the bottom of the flask and hexane was decanted. The copolymer was immediately dissolved in chloroform and cast onto mica. The incorporation of both pDMSA and pBA segments was confirmed by $^1$H NMR. Assignment of proton resonances is illustrated in FIG. 17.

Example 10b
Synthesis of Reactive Block Copolymers

To a 5 ml round bottom flask with magnetic stir bar was added pBA (0.5 g, 0.02 mmol), Cu(I)Br (2.8 mg, 0.02 mmol), dNbpy (16.3 mg, 0.04 mmol mmol). The flask was fitted with a rubber septum, evacuated under vacuum (1–5 mm Hg) and backfilled with $N_2$. This cycle was repeated three times. 3-(dimethoxymethylsilyl)propyl acrylate (0.46 mL, 2 mmol) and o-xylene (1 mL) was bubbled with nitrogen for 30 minutes and then added to the Schlenk flask via syringe. The flask and was then placed into an oil bath (90° C.) and samples were removed periodically via syringe for determination of conversions (by $^1$H NMR). Within 22 hrs, 25 min, a monomer conversion (p=0.64) was achieved.

Example 11
Synthesis of p(BA-b-MMA) Nanocomposite Particles

The synthesis of nanocomposite particles composed of a silica core and outer shells of p(BA-b-MMA) were prepared using ATRP. Initial attempts to prepare p(BA-b-MMA) $SiO_2$ nanocomposite particles were unsuccessful due to gelation from interparticle radical coupling reactions. To avoid this side reaction, polymerizations should be conducted using more dilute concentrations of colloidal initiators and catalyst. The general procedure successfully employed in the synthesis of p(BA-b-MMA) particles was the following.

11a. General procedure t-pBA Particles:

To a 25 ml Schlenk flask with magnetic stir bar was added silica particles (250 mg, 0.078 mmol), dNbpy (424 mg, 1.03 mmol), Cu(I)Br (67.5 mg, 0.472 mmol) and Cu(II)$Br_2$ (10.5 mg, 0.047 mmol). The flask was fitted with a rubber septum and evacuated under vacuum (1–5 mm Hg) and back filled with nitrogen (3-cycles). Monomer (n-BA, 24 mL, 169 mmol) was bubbled for 30 minutes with nitrogen and added to the flask via syringe. The flask was then placed into an oil bath (90° C.) for 9 hrs, 28 min and sample removed to determine monomer conversion (by $^1$H NMR and gravimetry) Polymers were recovered by precipitation into MeOH/$H_2$O (4:1 by volume, ten-fold excess of solution relative to polymer solution).

11b. General Procedure t-p(BA-b-MMA) Particles:

To a 25 ml Schlenk flask with magnetic stir bar was added t-pBA silica particles (100 mg), dNbpy (34.3 mg, 0.084 mmol), Cu(I)Cl (3.92 mg, 0.040 mmol) and Cu(II)$Br_2$ (0.5 mg, 0.004 mmol). The flask was fitted with a rubber septum and evacuated under vacuum (1–5 mm Hg) and back filled with nitrogen (3-cycles). Monomer (MMA, 2.2 mL, 20.5 mmol) was bubbled for 30 minutes with nitrogen and added to the flask via syringe. The flask was then placed into an oil bath (90° C.) and samples were removed periodically via syringe to monitor monomer conversion (by $^1$H NMR and gravimetry.) After 53 min., reaction solution turned green. An additional 2 equivalents of Cu(I) and Cu(II) were added to reaction vessel by first freezing the reaction solution, added the transition metals/ligands and performing 3-freeze pump thaw cycles. Polymers were by precipitation into isopropanol after allowing a reaction time of 1 hr, 36 min. Stoichiometry of pBA Particle Synthesis 1) ATRP of BA:
[M]:[I]:[Cu(I)Br]:[Cu(II)$Br_2$]:[dNbpy], 90 C.
7.04 M: 0.003 M: 0.019 M: 0.0019 M: 0.043 M, 9 hrs 28 min
p(grav=2%), $M_{n\,theo}$=6,400, $M_{n\,SEC}$=8,290; $M_w/M_n$=1.50
77% initiation efficiency 2) ATRP of MMA from pBA composite nanoparticles
[M]:[Cu(I)Br]:[Cu(II)$Br_2$]:[dNbpy], 90 C.
9.3 M: 0.054 M: 0.0054 M: 0.1014 M
p($^1$H NMR~7%); $M_{n\,SEC}$=33,700; $M_w/M_n$=1.28
initially ⅓ amt of Cu added-turned green <1 hr.
additional 2 eq Cu added 1 hrs 36 min
compositions (NMR)=72% PMMA In the ATRP of BA from particles, despite the presence of 10% Cu(II) (relative to Cu(I)), a high polydispersity was still observed in the cleaved pBA ($M_n$=8,290; $M_w/M_n$=1.50). Determination of conversion was done by gravimetric analysis, where a small aliquot of the polymerization mixture was put under vacuum (0.05 mm Hg, several days) to remove monomer. The conversion was determined to be 2% from this analysis. Comparison of the initiation efficiency by dividing $M_{n\,theoretical}$ by $M_{n\,sec}$ equaled 77%.

The pBA particles were then used in the ATRP of MMA. Initially a concentration of 0.054 M of Cu(I)Br was used in the reaction, which at least two times larger than the [Br] in the reaction. However, after less than 53 minutes, the reaction mixture became completely green, implying that early termination reactions consumed the Cu(I) species of the active catalyst. Such a result implied that intramolecular termination of tethered polymeric radicals occurred in the early stages of the polymerization. This side reaction could be circumvented by using a significantly lower catalyst concentration, ideally below that of the [Br]. However, since lower the catalyst concentration would extend the reaction time to approximately 1 week (as observed in previous ATRP experiments), additional catalyst (2 equivalents) was added to the polymerization mixture to drive the reaction to completion. After 1 hr and 36 min., $^1$H NMR indicated that a 7% monomer conversion had been achieved. Quantitative gravimetric analysis for monomer conversion is currently being performed.

Both pBA and p(BA-b-MMA) particles were soluble in THF, toluene and passed through PTFE 0.2 micron filters.

Treatment of these particles with HF was conducted (100 mg particles, 8 mg Aliquat 336, 2 mL (50%) HF, in 2 mL toluene, 24 hrs, 20° C.) to recover cleaved (co)polymers for SEC analysis. SEC traces indicated that clean chain extension from the pBA particles to pMMA had occurred. $^1$H NMR of the cleaved p(BA-b-MMA) block copolymer enabled calculation of composition (72-mol % pMMA).

We claim:

1. A polymerization process, comprising:
  polymerizing one or more first free radically polymerizable (co)monomers in the presence of an initiation system comprising:
    a functional particle initiator comprising:
      a nanoparticle; and
      a group comprising a radically transferable atom or group; and
    a catalyst comprising a transition metal complex which participates in a reversible redox cycle with at least one of the functional particle initiator and a growing polymer chain, to form a nanocomposite particle with a tethered polymer chain;
  polymerizing one or more second radically polymerizable comonomers on the tethered polymer chain to form an tethered copolymer chain.

2. The polymerization process of claim 1, wherein the nanocomposite particle comprises the nanoparticle and a tethered copolymer.

3. The polymerization process of claim 1, wherein the nanoparticle comprises silicon.

4. The polymerization process of claim 1, comprising a plurality of functional nanoparticle initiators, wherein the nanoparticles have a narrow particle size distribution.

5. The process of claim 1, further comprising isolating a nanocomposite material comprising the nanoparticle and the tethered copolymer chain.

6. The process of claim 1, wherein the functional particle further comprises a functional group including the radically transferable atom or group.

7. The process of claim 1, wherein at least one of the first free radically polymerizable monomer(s) and the second radically polymerizable comonomer(s) comprise a functional group.

8. The process of claim 7, wherein the functional group comprises at least one of a hydrophilic group, a hydrophobic group, chain extension group and a crosslinking group.

9. The process of claim 1, wherein the nanocomposite particle comprises second functional groups.

10. The process of claim 9, wherein the second functional group comprises a chromophore.

11. The process of claim 5, wherein the nanoparticles comprise silica or silicate particles.

12. The process of claim 11, wherein the silicate particles are polysilsesquioxane particles.

13. The process of claim 1, the ratio of the catalyst to the radically transferable atoms or groups is greater than 1.

14. A process for the preparation of a functional particle comprising:
  providing a polysilsesquioxane particle comprising reactive groups on the surface; and
  reacting a silane with the polysilsesquioxane particle, wherein the silane comprises:
    a first functional group comprising a polymerization initiation site; and
    a second functional group comprising an alkoxy group.

15. The process of claim 14, wherein the initiation site comprises a radically transferable atom or group.

16. The process of claim 14, comprising a plurality of polysilsesquioxane particles having a narrow particle size distribution.

17. The process of claim 14, further comprising reacting at least a portion of the reactive groups on the surface with a second silane.

18. The process of claim 17, wherein the silane comprising the polymerization site and second silane are reacted sequentially to the polysilsesquioxane particle.

19. The process of claim 10, wherein the number of reactive groups is greater than 100.

20. A process for the preparation of a functional particle, comprising:
  preparing a silica particle in a first solvent to form a colloid;
  adding a second solvent to the colloid;
  removing the first solvent from the colloid; and
  reacting a silane with the silica particle, wherein the silane comprises a functional group.

21. The process of claim 20, further comprising:
  isolating the functional particle.

22. The process of claim 20, wherein the second solvent is a high boiling solvent.

23. The process of claim 22, wherein separating the silica particle from the first solvent comprises a distillation process.

24. The process of claim 23, wherein the first solvent is an alcohol or water.

25. The process of claim 20, further comprising:
  contacting a second silane with the functional particle to react with any remaining residual silanol groups.

26. The process of claim 14, wherein the particles have diameters between 5 and 200 mm.

27. The process of claim 14, wherein the particles have diameters between 10 and 50 mm.

28. The process of claim 14, further comprising:
  preparing the polysilsesquioxane particle in a microemulsion process.

29. The process of claim 28, further comprising adding a third solvent to the functional particle.

30. The process of claim 29, wherein the third solvent is a polar solvent.

31. The process of claim 30, wherein the third solvent is tetrahydrofuran.

32. The process of claim 20, further comprising surface treating the silica particle with one or more surface treating agents.

33. The process of claim 32, wherein the surface treating comprises a first coating treatment partially coating the particle and a second coating treatment comprising a coating agent with a functional group.

34. The process of claim 33, wherein the functional group is a group that can either respond to external stimulation or initiate a radical polymerization process or both.

35. The process of claim 34, wherein the particles have a narrow particle size distribution.

36. The process of claim 35, wherein the particles have diameters between 5 and 200 nm.

37. The process of claim 36, wherein the particles have diameters between 10 and 50 nm.

38. The process of claim 33, wherein the ratio of coating agents in the first coating treatment to coating agents in the second coating treatment determines the number of functional groups capable of initiating polymerization on the particle surface and wherein the average number of functional groups on the particle surface is between 1 and 1 million.

39. The process of claim 20, wherein the average number of functional groups on the particle surfaces is between 100 and 100,000.

40. The process of claim 38, wherein the average number of functional groups that can initiate a radical polymerization process is between 300 and 30000.

41. A process for the preparation of a nanocomposite structure, comprising:
provide a material comprising:
a nanocomposite particle comprising silicon; and
a tethered polymer, wherein the tethered polymer comprises free radically (co)polymerizable monomer units; and
casting, depositing or forming the material into the nanocomposite structure.

42. The process of claim 41, wherein the nanocomposite structure is a film, fiber or article.

43. The process of claim 41, wherein the tethered polymer is a block copolymer.

44. The process of claim 43, wherein the tethered block copolymer comprises terminal functionality and the process further comprises:
reacting the terminal functionality to chain extend the copolymer forming a network of nanocomposite particles, wherein the periodicity of the nanocomposite particles in the network is dependent on the size of the silicon based particle and the molar mass of the attached polymer chains.

45. The process of claim 41, wherein the nanocomposite particle comprises a particle selected from the group consisting of polysilsesquioxane or a silica with a tethered block copolymer chains.

46. The process of claim 34, wherein the nanocomposite particle further comprises a second functional group.

47. A process for the preparation of functional particles, comprising:
providing colloidal particles in a first solvent;
diluting colloidal particles, wherein the colloidal particles comprise a silanol group, in a second solvent wherein the second solvent has a higher boiling point than the first solvent;
removing at least a portion of the first solvent;
contacting the colloidal particles with a reactive silane comprising a radically transferable atom or group;
adding hexamethyldisilazane to react with any remaining residual silanol groups, thereby providing redispersable particles; and
optionally, isolating the redispersable particles.

48. The process of claim 47, wherein the second solvent is a ketone or an ether.

49. The process of claim 47, wherein the second solvent is a dioxane.

50. The process of claim 20 wherein the second solvent is a dioxane.

51. A nanocomposite particle, comprising:
a core comprising silicon; and
a grafted (co)polymer chain comprising two or more free radically (co)polymerizable monomers attached to the core.

52. The nanocomposite particle of claim 51, wherein the grafted (co)polymer chain comprises a block copolymer.

53. The nanocomposite particle of claim 52, wherein the block copolymer that can phase separate into two or more phases.

54. The nanocomposite particle of claim 51, wherein the grafted (co)polymer chain comprises a gradient copolymer.

55. A polymerization process, comprising:
polymerizing one or more first free radically polymerizable (co)monomers in the presence of an initiation system comprising:
a functional particle initiator comprising:
a nanoparticle comprising polysilsesquioxane; and
a group comprising a radically transferable atom or group; and
a catalyst comprising a transition metal complex which participates in a reversible redox cycle with at least one of the functional particle initiator and a growing polymer chain, to form a nanocomposite particle with a tethered polymer chain.

56. The polymerization process of claim 55, further comprising:
polymerizing one or more second radically polymerizable comonomers on the tethered polymer chain to form an tethered copolymer chain.

57. A process for preparation of a nanocomposite particle, comprising:
providing a block copolymer comprising:
reactive silicon groups;
a first polymeric segment; and
a second polymeric segment;
phase separating the first and second polymeric segments of the block copolymer; and
crosslinking the reactive silicon groups.

58. The process of claim 57, wherein the reactive silicon comprising segments a comprises a dialkoxylsilyl group.

59. The process of claim 57, wherein the phase separating is in solution or on a surface.

60. The process of claim 9, wherein the second functional group comprises light responsive functionality.

61. The process of claim 60, wherein the second functional group is a chromphore.

62. The process of claim 41, wherein the material further comprises a solvent.

63. The process of claim 62, wherein the solvent is a polar solvent.

64. The process of claim 62, wherein the solvent is a nonpolar solvent.

* * * * *